US007664397B2

(12) United States Patent
Yuki et al.

(10) Patent No.: US 7,664,397 B2
(45) Date of Patent: Feb. 16, 2010

(54) OPTICAL NETWORK SYSTEM

(75) Inventors: Masahiro Yuki, Kawasaki (JP); Toru Katagiri, Kawasaki (JP); Takao Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 481 days.

(21) Appl. No.: 11/038,281

(22) Filed: Jan. 21, 2005

(65) Prior Publication Data

US 2006/0029391 A1    Feb. 9, 2006

(30) Foreign Application Priority Data

Aug. 3, 2004  (JP) ............................. 2004-226800

(51) Int. Cl.
*H04B 10/00* (2006.01)
(52) U.S. Cl. ............................. 398/58; 398/16; 398/10; 398/34
(58) Field of Classification Search ............. 398/45–57, 398/9–38, 58
See application file for complete search history.

(56) References Cited

U.S. PATENT DOCUMENTS

| | | | | |
|---|---|---|---|---|
| 5,276,440 A * | 1/1994 | Jolissaint et al. | ....... | 340/825.02 |
| 5,394,732 A * | 3/1995 | Johnson et al. | ............... | 73/19.1 |
| 5,956,165 A * | 9/1999 | Fee et al. | ........................ | 398/78 |
| 6,075,630 A * | 6/2000 | Nishio | .......................... | 398/25 |
| 6,256,140 B1 * | 7/2001 | Kobayashi | ............... | 359/341.3 |
| 6,295,540 B1 * | 9/2001 | Sanschagrin et al. | ........ | 707/201 |
| 6,529,316 B1 * | 3/2003 | Treyz et al. | ............ | 359/337.11 |
| 6,532,089 B1 | 3/2003 | Asahi | | |
| 6,559,984 B1 * | 5/2003 | Lee et al. | ........................ | 398/5 |
| 6,570,867 B1 * | 5/2003 | Robinson et al. | ............. | 370/351 |
| 6,614,587 B1 * | 9/2003 | Yu et al. | ................. | 359/337.12 |
| 6,621,625 B1 * | 9/2003 | Zhang et al. | ........... | 359/341.42 |
| 6,671,254 B1 * | 12/2003 | Nakahira | ...................... | 370/229 |
| 6,701,087 B2 * | 3/2004 | Beine et al. | .................... | 398/38 |
| 6,707,599 B1 * | 3/2004 | Ye et al. | ................. | 359/341.41 |
| 6,959,126 B1 * | 10/2005 | Lofland et al. | ................. | 385/16 |
| 6,961,525 B2 * | 11/2005 | Li | ............................. | 398/197 |
| 6,975,785 B2 * | 12/2005 | Ghandi et al. | .................. | 385/16 |
| 6,980,736 B1 * | 12/2005 | Fee et al. | ....................... | 398/19 |

(Continued)

FOREIGN PATENT DOCUMENTS

JP          8-288905          11/1996

(Continued)

OTHER PUBLICATIONS

Office Action mailed on Nov. 27, 2007 and issued in corresponding Japanese Patent Application No. 2004-226800.

(Continued)

*Primary Examiner*—Agustin Bello
(74) *Attorney, Agent, or Firm*—Staas & Halsey LLP

(57) ABSTRACT

An optical network system enabling confirmation of connection and tracking of wavelength paths at a high speed and a low cost without introducing any special hardware by having a wavelength path monitoring unit in an NMS give temporary change of optical power through a change generating unit to an optical signal S from an optical transmitting/receiving node, by having a change detecting unit confirm that this change of optical power has propagated through an optical transmission line and appeared at each node on the way, and confirming connections and monitoring the wavelength path while confirming the presence of the change.

21 Claims, 22 Drawing Sheets

U.S. PATENT DOCUMENTS

| | | | |
|---|---|---|---|
| 7,016,607 B1 * | 3/2006 | Carrick et al. | 398/32 |
| 7,058,301 B2 * | 6/2006 | Bosloy et al. | 398/38 |
| 7,064,890 B2 * | 6/2006 | Kakui | 359/341.5 |
| 7,155,126 B2 * | 12/2006 | Rutledge et al. | 398/50 |
| 7,190,902 B2 * | 3/2007 | Solheim et al. | 398/69 |
| 7,260,327 B1 * | 8/2007 | Shin et al. | 398/51 |
| 7,283,480 B1 * | 10/2007 | Whittaker | 370/245 |
| 7,391,971 B2 * | 6/2008 | McCloskey et al. | 398/38 |
| 2002/0135840 A1 * | 9/2002 | Spagnoletti et al. | 359/128 |
| 2002/0176130 A1 * | 11/2002 | Maeno | 359/110 |
| 2003/0016411 A1 * | 1/2003 | Zhou et al. | 359/110 |
| 2003/0081282 A1 * | 5/2003 | Yamakawa | 359/124 |
| 2003/0133713 A1 * | 7/2003 | Ng et al. | 398/37 |
| 2003/0210908 A1 * | 11/2003 | Levy et al. | 398/33 |
| 2003/0231886 A1 * | 12/2003 | Young et al. | 398/101 |
| 2004/0008988 A1 * | 1/2004 | Gerstal et al. | 398/45 |
| 2004/0120710 A1 * | 6/2004 | Seddigh et al. | 398/33 |
| 2004/0190900 A1 * | 9/2004 | Yagyu | 398/57 |
| 2004/0208549 A1 * | 10/2004 | Rutledge et al. | 398/50 |
| 2005/0249505 A1 * | 11/2005 | Manderscheid et al. | 398/177 |
| 2006/0029391 A1 * | 2/2006 | Yuki et al. | 398/45 |
| 2006/0127088 A1 * | 6/2006 | Guild | 398/50 |

FOREIGN PATENT DOCUMENTS

| | | |
|---|---|---|
| JP | 2000-69510 | 3/2000 |
| JP | 2000-183853 | 6/2000 |
| JP | 2002-353906 | 12/2002 |
| JP | 2003-143113 | 5/2003 |

OTHER PUBLICATIONS

Japanese Patent Office Action, mailed Mar. 11, 2008 and issued in corresponding Japanese Patent Application No. 2004-226800.

* cited by examiner

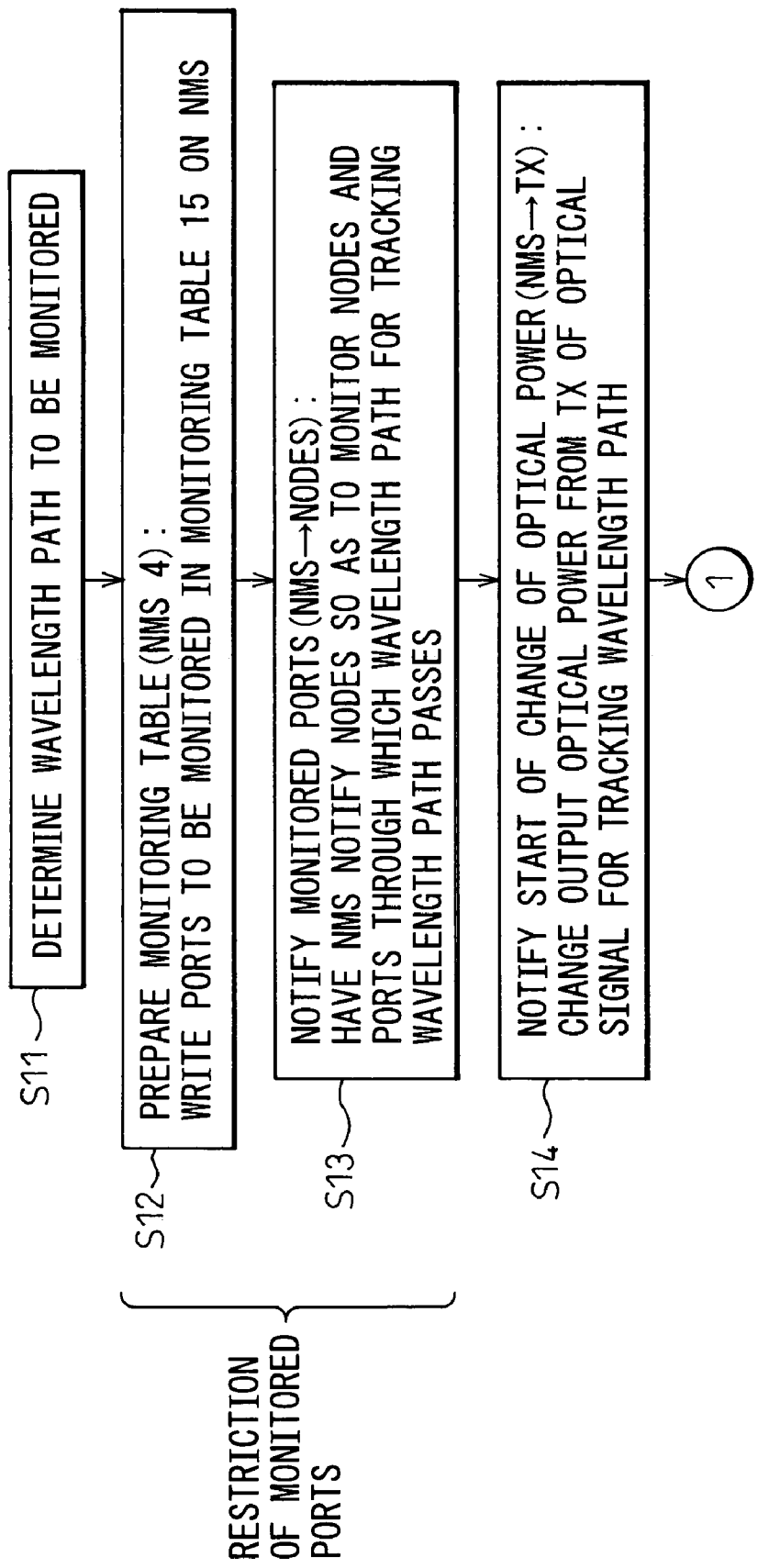

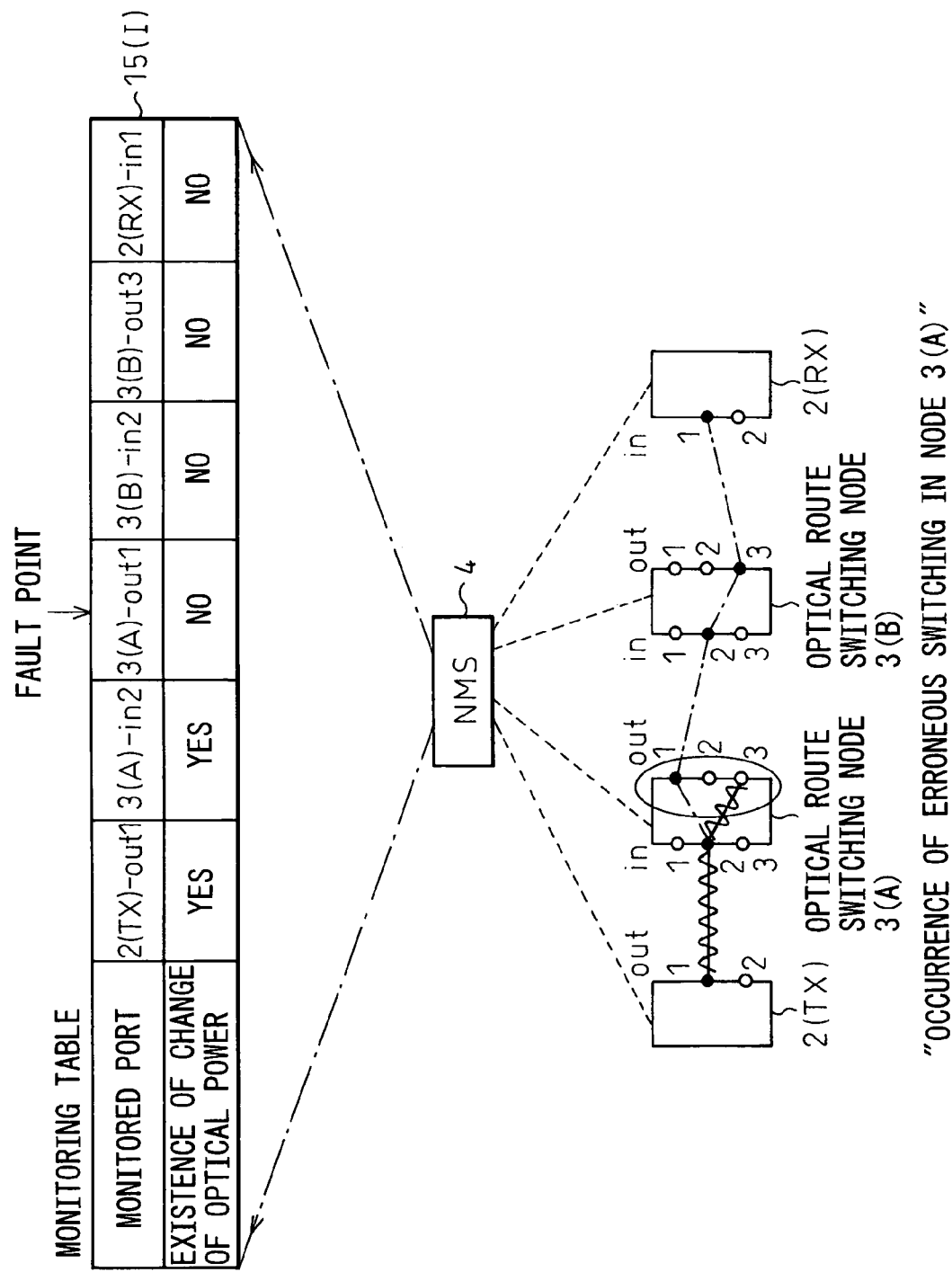

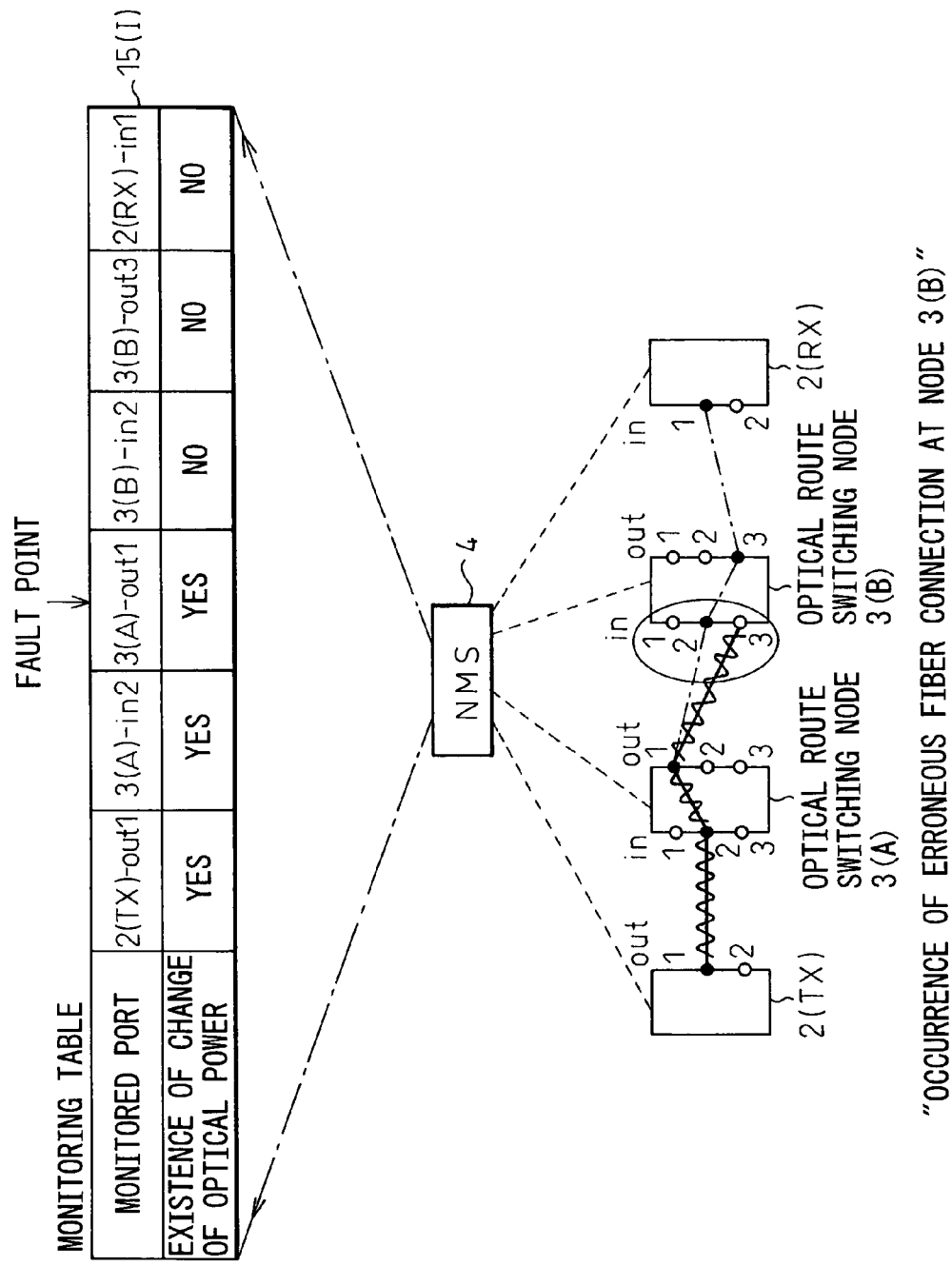

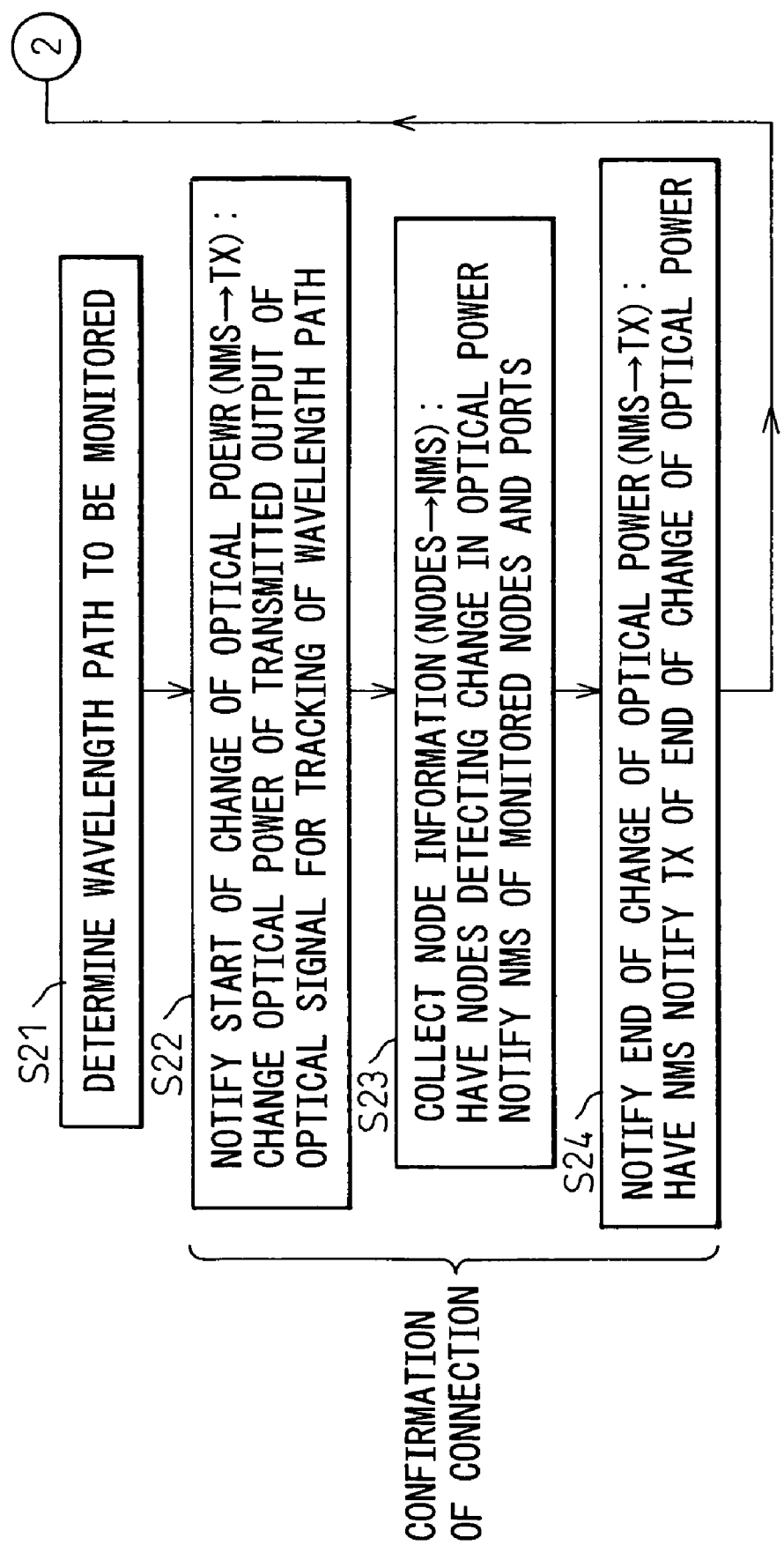

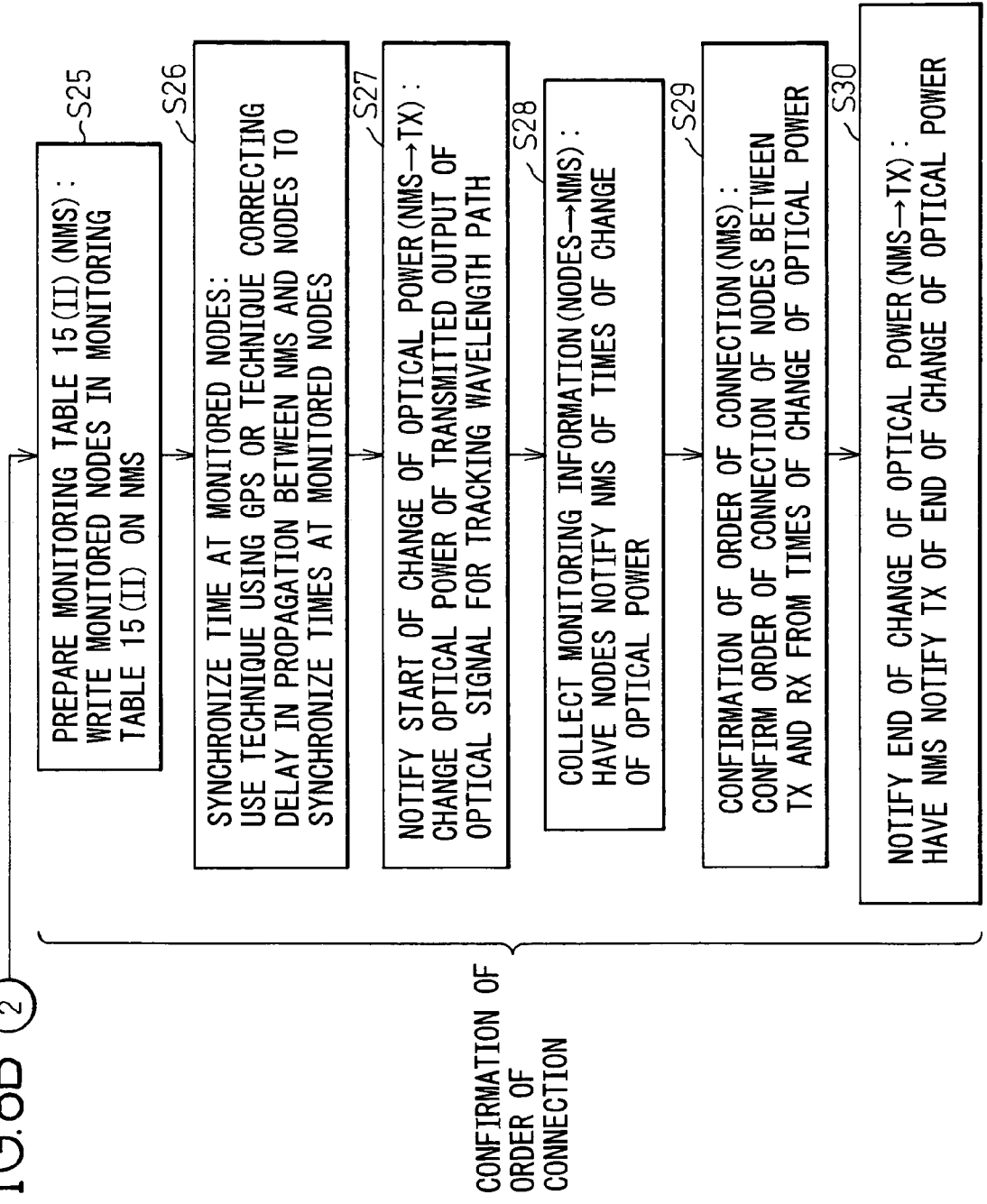

FIG.12
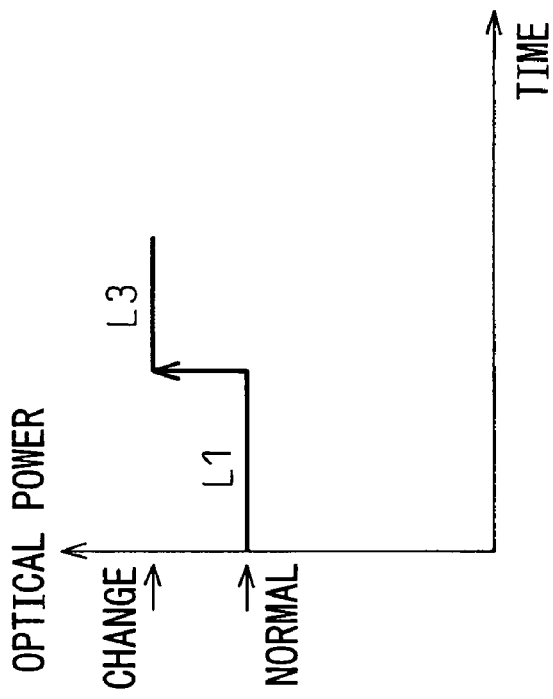
(a)
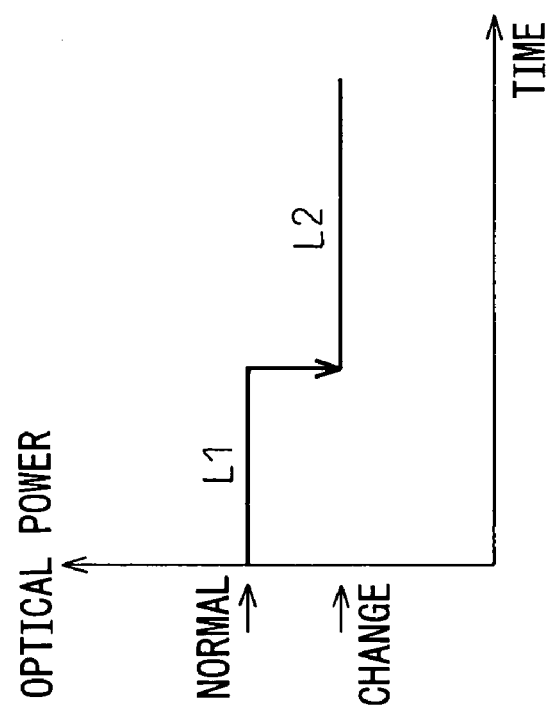
(b)

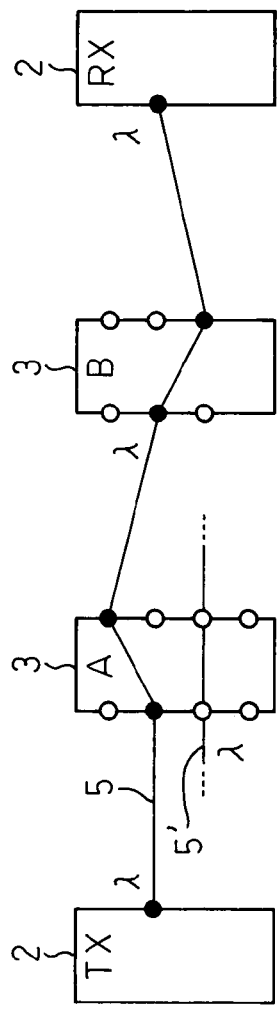
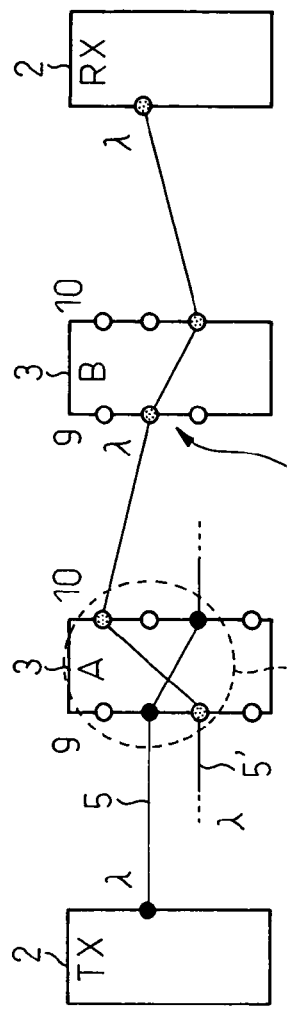
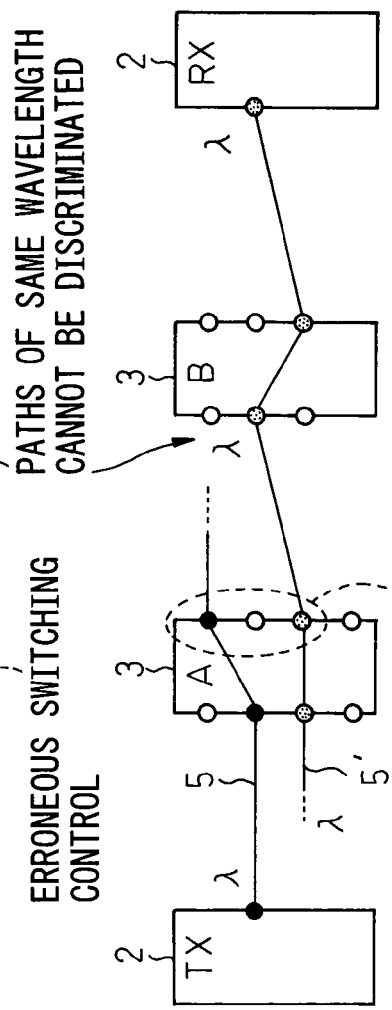
FIG.20A EXAMPLE OF CORRECT CONNECTION
FIG.20B ERRONEOUS CONNECTION EXAMPLE 1
FIG.20C ERRONEOUS CONNECTION EXAMPLE 2

OPTICAL NETWORK SYSTEM

BACKGROUND OF THE INVENTION

1. Field of the Invention

The present invention relates to an optical network system, more particularly relates to an optical network system constructed including a plurality of optical route switching nodes having optical route switching functions, still more particularly relates to wavelength path monitoring in an optical network system for confirming and tracking whether a wavelength path specified from one optical transmitting/receiving node forming a transmitting side optical transmitting/receiving end office to another optical transmitting/receiving node forming a receiving side optical transmitting/receiving end office has, as designated, been connected passing through all of a series of optical route switching nodes to be passed through along that wavelength path, that is, "confirmation of connection of wavelength path" and "tracking of wavelength path".

Here, "confirmation of connection of wavelength path" means basically confirming if each optical route switching node on the wavelength path has correctly performed the routing between the plurality of input ports and plurality of output ports of the node, while "tracking of wavelength path" means basically confirming what sequence a transmitted optical signal has passed through the optical route switching nodes.

2. Description of the Related Art

The scope of application of this optical network system is extremely broad covering for example long distance backbone systems, metro cores, and metro accesses. The network configurations began from the initial so-called "point-to-point" configurations and have grown to so-called ring-type configurations or mesh-type configurations using optical add/drop multiplexing (OADM) nodes or optical route switching nodes for adding/dropping optical signals or switching optical routes without converting optical signals to electrical signals. The realization of such network configurations is making possible use of much more flexible and reliable networks than the past.

Here, an explanation will be given of the related art for the above wavelength path monitoring in such an optical network system. As wavelength path monitoring technology of the related art, the following related art "A", related art "B", and related art "C" are known.

(a) The related art "A" is a technique using an optical splitter to take out part of the optical power from a wavelength division multiplexing (WDM) optical signal at each of a plurality of input ports and output ports of an optical route switching node, inputting it to for example an optical spectrum monitor (OSM), measuring the wavelength and optical power of the WDM optical signal, comparing the wavelength at an input port and the wavelength at an output port by the OSM, and confirming that the two match, that is, a technique for wavelength path monitoring utilizing only wavelength information as the wavelength path identifier.

(b) The related art "B" is a technique using an optical splitter to take out part of the optical power from a WDM optical signal at each of a plurality of input ports and output ports of an optical route switching node, using for example a variable optical filter or optical splitter to take out just one wavelength, using a SONET/SDH detector to analyze the content of the so-called J1 byte and J2 byte in the SONET/SDH overhead of the optical signal of the taken out wavelength, and using that analysis for the "confirmation of connection of wavelength path", that is, a technique for wavelength path monitoring utilizing specific bytes in the SONET/SDH overhead.

(c) The related art "C" is a technique using a specialized pilot tone modulator to superpose a pilot signal as wavelength path information on an optical main signal at the above optical transmitting/receiving node or optical route switching node, using a specialized pilot tone demodulator to detect the pilot signal superposed on the optical main signal as an identifier of the wavelength path at the optical transmitting/receiving node or optical route switching node receiving that signal, and using the pilot signal, differing in amplitude, frequency, or phase for each wavelength of the WDM, as an identifier for "confirmation of connection of wavelength path" for each wavelength, that is, a technique for wavelength path monitoring superposing a pilot signal of a low frequency analog signal on the optical main signal and utilizing this as a wavelength identifier.

The "connection information inside the nodes" acquired using any of the above techniques (prior arts "A", "B", and "C") and the network management system (NMS) are held in advance. If comparing this against the "network configuration information" including the connection information between the nodes and the optical transmission lines (optical fibers) and specifying the path of the optical signal, it is also possible to perform the "tracking of the wavelength path".

As known publications relating to the present invention, for example, there are Japanese Unexamined Patent Publication (Kokai) No. 2000-69510, Japanese Unexamined Patent Publication (Kokai) No. 8-288905, and Japanese Unexamined Patent Publication (Kokai) No. 2000-183853. Japanese Unexamined Patent Publication (Kokai) No. 2000-69510 discloses use of the light level as the identifier of light in monitoring the optical connection at input/output ports of an optical route switching device (similar to the above prior art "A"), Japanese Unexamined Patent Publication (Kokai) No. 8-288905 discloses an optical cross connect system allocating wavelength as the routing information among the nodes to form an optical network which enables the settings of the optical path to be easily monitored, and Japanese Unexamined Patent Publication (Kokai) No. 2000-183853 discloses a wavelength multiplexed transmission system which enables the normalcy of connection to be confirmed.

Summarizing the problems to be solved in the invention, as the problem in the prior art "a", as explained in detail later with reference to FIG. 20, in an optical network, if there are different optical transmission lines, there may also be a plurality of wavelength paths of the same wavelength. Therefore, wavelength paths of the same wavelengths may sometimes be simultaneously connected to a plurality of input ports in a single optical route switching node. Accordingly, there is the problem that with just the above wavelength information, it is not possible to discriminate between different wavelength paths having the same wavelength. Further, as shown in FIG. 20B and FIG. 20C, there is the problem that sometimes "error of wavelength path connection" due to "erroneous control of optical path switching" or "erroneous correction between nodes of optical fiber" cannot be detected.

As the problem in the prior art "B", if once trying to confirm the wavelength path connection information of optical signals, it is necessary to split the optical power and split the wavelength of the WDM signal and input the optical signal to the SONET/SDH detector at each of the input and output ports of the optical route switching nodes and, if increasing the wavelengths, necessary to split the power and split the wavelength further in accordance with the same and lead them to the SONET/SDH detector, so there is the problem that the size of the hardware and the costs of the nodes end up becoming enormous.

Conversely, if trying to confirm the connection of the wavelength path by a single SONET/SDH detector, while the increase in size and costs can be suppressed, there is the problem that a long time ends up being required until finishing confirming the connection of the wavelength path for all of the ports.

As the problem in the prior art "C", modulators and demodulators especially for the pilot tone become necessary. There is therefore the problem that when the optical network is expanded in size, management of the pilot signal becomes complicated. Further, when individual networks originally comprised of different vendor systems are connected with each other, it is necessary to provide modulators and demodulators for the pilot tone common to the vendors and use common formats. However, when modulators and demodulators for the pilot tone cannot be provided due to hardware restrictions, there is the problem that realization of wavelength path monitoring by the pilot tone becomes difficult.

As the problem "D", in recent years, construction of an optical network system independent of format which can directly accommodate Gigabit Ethernets (GbE) or 10 GbE optical interfaces at the wavelength of the backbone network is starting to be proposed. When assuming such an optical network system, there is the problem that the format-dependent wavelength path connection confirmation technique using the SONET/SDH overhead such as the above prior art "B" cannot be employed.

As the problem "E" in an NMS arising due to the enlargement of the network scale, as explained above, the wavelength path monitoring is realized by comparing the network configuration information such as the connection information between the nodes and the optical fibers acquired in advance in the NMS and the wavelength path connection information in the nodes collected from the nodes, but if the network is enlarged in scale, the network configuration information to be managed by the NMS and the node internal connection information collected from the nodes also increase. Therefore, there is the problem that the load on the NMS rises and processing time for wavelength path monitoring increases. Also, the efficiency of not only the wavelength path monitoring, but also the overall functions of the NMS are liable to end up being reduced. Further, when newly introducing nodes or when otherwise combining network configuration information by the NMS, there is the problem that even if the connections in a node can be confirmed, the relative connections between nodes are not known, so the "tracking of the wavelength paths" becomes difficult.

SUMMARY OF THE INVENTION

An object of the present invention is to provide an optical network system able to simultaneously solve the above problems.

To attain the above object, there is provided an optical network system enabling confirmation of connection and tracking of a wavelength path at a high speed and a low cost without introducing any special hardware by having a wavelength path monitoring means (13) in an NMS (4) temporarily change the optical power through a change generating means (11) to an optical signal S from an optical transmitting/receiving node (2-TX), by having change detecting means (12) confirm that this change of optical power has propagated through an optical transmission line (5) and appeared at each node (3) on the way, and confirming connections and monitoring the wavelength path while confirming the presence of the change.

BRIEF DESCRIPTION OF THE DRAWINGS

These and other objects and features of the present invention will become clearer from the following description of the preferred embodiments given with reference to the attached drawings, wherein:

FIGS. 4A and 4B are flow charts of a tracking routine of a wavelength path in a model of FIG. 3;

FIG. 5 is a view of a first example of detection of a fault point;

FIG. 6 is a view of a second example of detection of a fault point;

FIGS. 8A and 8B are flow charts of a tracking routine of a wavelength path in a model of FIG. 7;

FIG. 12 is a view of a first example (a) and second example (b) of optical power change;

FIG. 20A is a view of an example of correction connection of a wavelength path, while FIGS. 20B and 20C are views of two examples of the case of occurrence of erroneous connection.

DESCRIPTION OF THE PREFERRED EMBODIMENTS

Preferred embodiments of the present invention will be described in detail below while referring to the attached figures.

Figure 1:
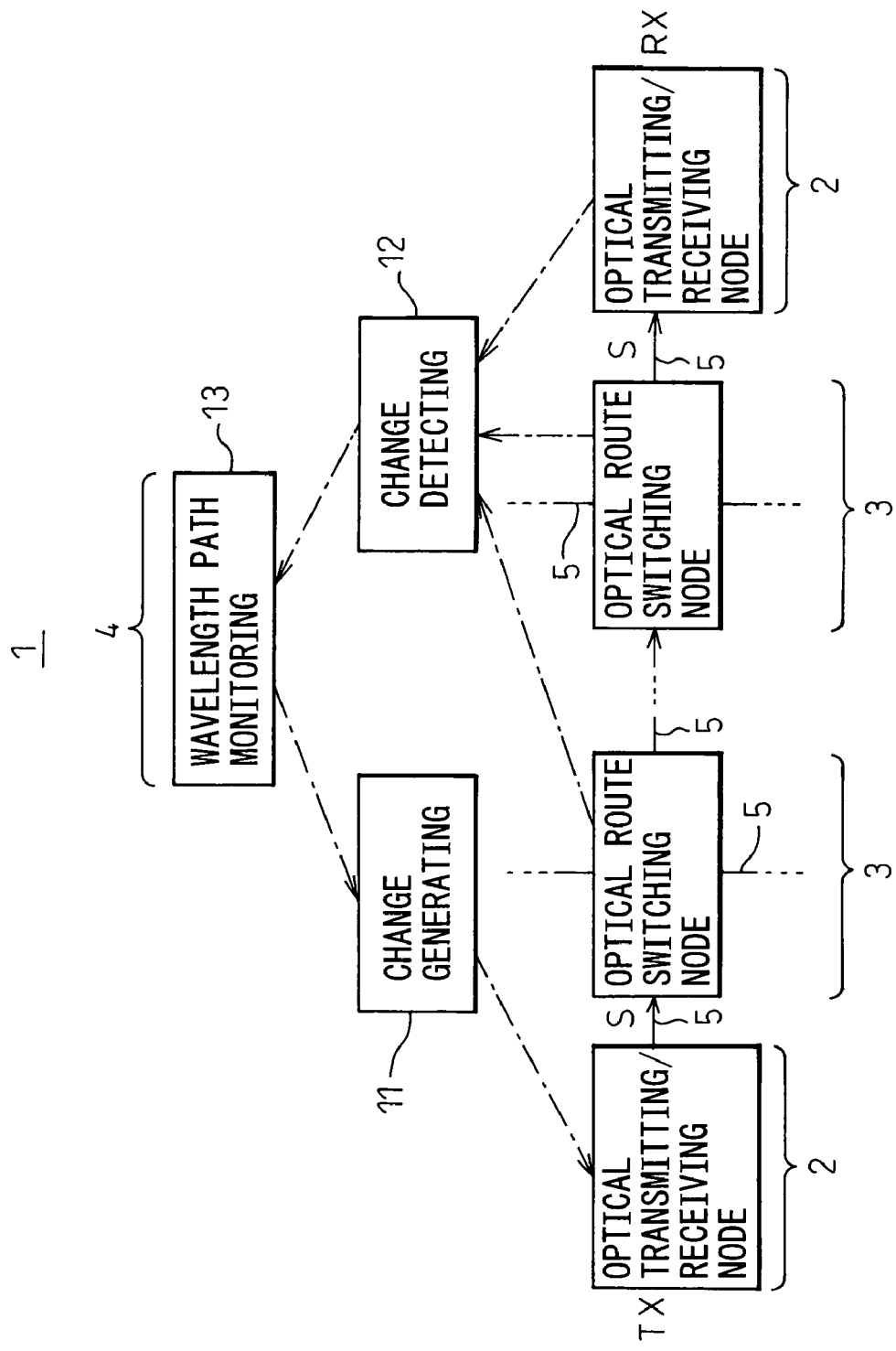
FIG. 1 is a block diagram of the basic functions of an optical network system according to the present invention.

FIG. 1 is a block diagram of the basic functions of an optical network system according to the present invention. In the figure, reference numeral 1 shows an optical network system according to the present invention. This system 1 is provided with optical transmitting/receiving nodes 2 forming optical transmitting/receiving end offices of an optical signal S, optical route switching nodes 3 for switching the optical route of the optical signal S, and a network management system (NMS) 4 for managing these nodes 2 and 3 and the optical transmission lines 5 connecting these nodes. Note that in the figure, an optical transmitting/receiving node 2 forming a transmitting side (TX) of an optical signal S is made the left end node 2 (TX) and the optical transmitting/receiving node 2 forming a receiving side (RX) of the optical signal S is made the right end node 2 (RX).

The basic functions of the present invention introduced to the optical network system 1 are realized by an illustrated change generating means 11, change detecting means 12, and wavelength path monitoring means 13. Note that the change generating means 11 is practically formed in the optical transmitting/receiving node 2 (TX), while the change detecting means 12 is practically formed in each of the optical route switching nodes and the optical transmitting/receiving node 2 (RX). The functions of these means 11, 12, and 13 are as follows. However, the first aspect and the second aspect differ in functions of the wavelength path monitoring means 13. The first aspect is for the case of storing in advance the above network configuration information in the NMS 4, while the second aspect is for the case of not storing the network configuration information in the NMS 4.

First Aspect (i) The change generating means 11 has the function of temporarily changing the optical transmission characteristics of an optical signal S transmitted from the optical transmitting/receiving node 2 (TX).

(ii) Each change detecting means 12 has the function of detecting if change of the optical transmission characteristics has occurred at the input port and output port (see 9 and 10 of FIG. 19) in the optical route switching node.

(iii) The wavelength path monitoring means 13 has the function of extracting only the monitored optical route switching nodes 3 through which the wavelength path to be monitored passes and the input ports and output ports of the nodes 3 based on the network configuration information which the NMS 4 holds and confirming that the change has appeared at all of the related input ports and output ports based on the results of detection of change obtained from the change detecting means 12 for the extracted monitored optical route switching nodes 3 so as to confirm connection and track the wavelength path monitored.

On the other hand, the second aspect differs from the first aspect (1) only in the function of the wavelength path monitoring means 13.

Second Aspect (iii) The wavelength path monitoring means 13 determines the wavelength path to be covered at the NMS 4, starts up the change generating means 11 at the optical transmitting/receiving node 2 (TX) forming the transmitting end office of the wavelength path determined, and identifies all of the optical route switching nodes 3 through which the wavelength path passes based on the results of detection of change due to the change detecting means 12 notified from all of the optical route switching nodes 3 so as to confirm connection and track the wavelength path monitored.

In the first and second aspects, one of the characterizing features of the present invention lies in the "temporary change of the optical transmission characteristics of the optical signal". The "optical transmission characteristics" spoken of here mean at least one of the characteristics of (a) optical power, (b) wavelength, (c) polarization, and (d) optical noise power. Therefore, the change generating means 11 is at least one of an (a) optical power changing means, (b) wavelength changing means, (c) polarization changing means, and (d) optical noise power changing means. Further, the change generating means 11 may temporarily maintain the change of (a), (b), (c), or (d).

If for example selecting the optical power as the optical transmission characteristic, the optical power changing means temporarily raises the power level of the optical signal S transmitted from the optical transmitting/receiving node 2 (TX). Alternatively, it temporarily lowers it. The present invention utilizes the fact that in the case of this example the change in the power level propagates through the optical route switching nodes 3 on the wavelength path and reaches the destination optical transmitting/receiving node 2 (RX) so as to confirm the connection and track the wavelength path.

Therefore, according to the present invention, (i) Any of the above "erroneous control of optical route switching" and "erroneous connection of nodes of the optical fiber" can be discovered, (ii) It is possible to perform wavelength path monitoring, that is, "confirmation of connection of wavelength paths" and "tracking of the wavelength path", without greatly increasing the scale or cost of the hardware of the nodes 2, 3, without relying on the bit rate or format of the optical signal, and without greatly increasing the load of the NMS.

These advantages are obtained by taking note of performing a simple operation on a basic optical characteristic such as the change of optical power of the optical signal S, the change of the wavelength, the change of the polarization, or the change of the optical noise power as an identifier of the wavelength path.

This point is the greatest point of difference from the technique of using the pilot tone of a low frequency analog signal such as in the above prior art "C". That is, according to the prior art "C", a monitoring mechanism such as a modulator or demodulator of the pilot tone becomes necessary, but the present invention may also introduce an extremely simple monitoring mechanism. Therefore, according to the present invention, it is possible to obtain the above advantages (i) and (ii).

To further understanding of the present invention, the conventional optical network system will be explained in further detail, then embodiments of the present invention will be explained.

Figure 16:
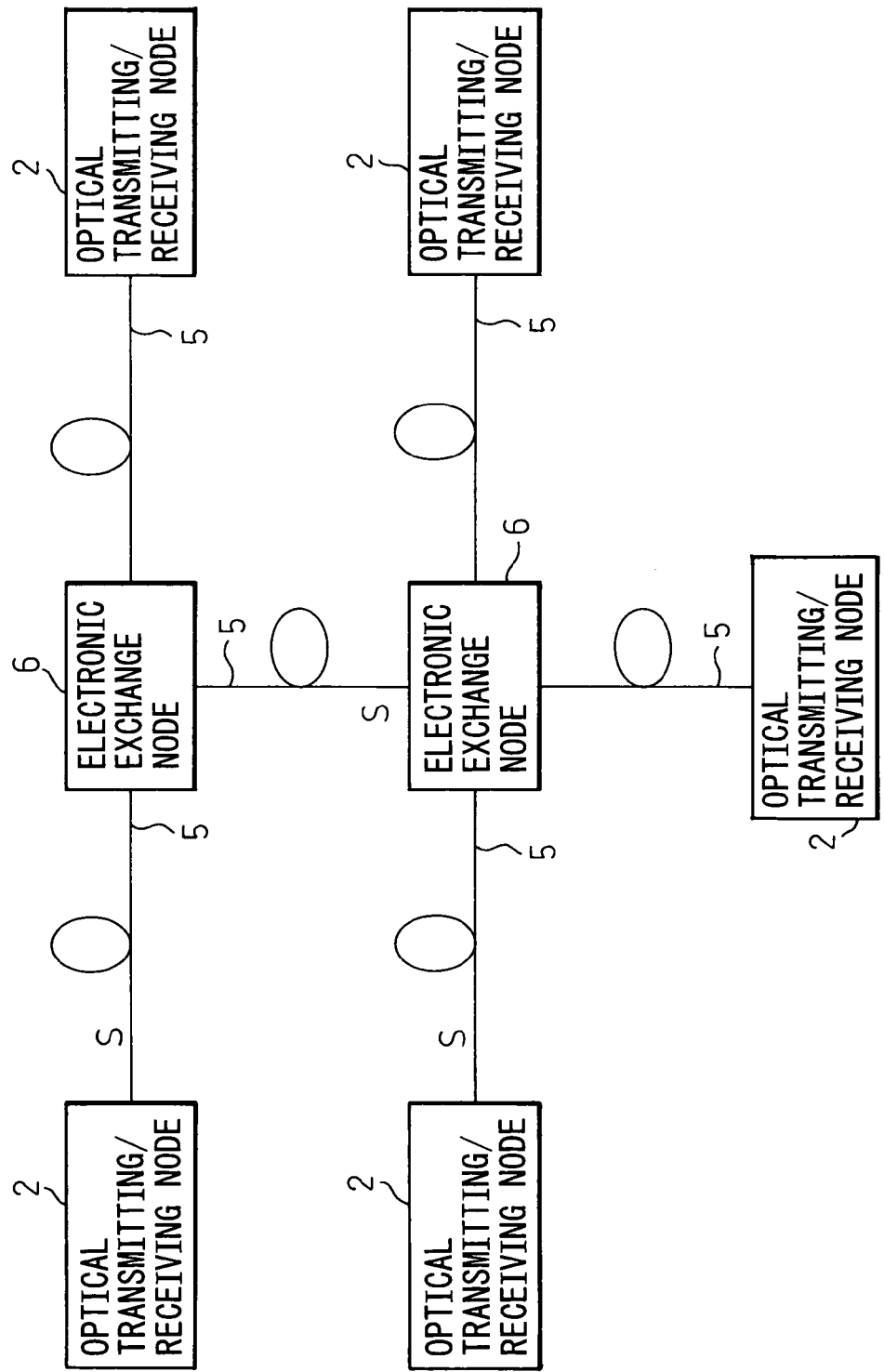
FIG. 16 is a view of an example of the configuration of a conventional optical communication system using electronic exchanges.

FIG. 16 is a view of an example of the configuration of a conventional optical communication system using electronic exchanges. Note that throughout the drawings, similar components are assigned the same reference numerals or notations. Therefore, in FIG. 16, the components assigned reference numerals 1 to 5 are substantially the same as the corresponding components shown in FIG. 1. The component assigned the reference numeral 6 is an electronic exchange node shown here for the first time. This electronic exchange node 6 is comprised of an above electronic exchange.

In this electronic exchange, the input optical signal S is converted to an electrical signal and is switched in route at the electrical stage, then the electrical signal is again converted to an optical signal S and the optical signal S is output toward the route in accordance with the destination.

In such a conventional optical communication system using electronic exchanges, much use is made of the SONET/SDH as the transmission format. By utilizing the so-called J1 and J2 bytes in the SONET/SDH path overhead, it becomes possible to confirm the path connection at the electrical stage.

On the other hand, due to recent advances in optical device technology and optical transmission technology, long distance transmission of optical signals of as much as several thousand kilometers without regenerative relaying at the electrical stage using O/E/O (optical/electrical/optical) conversion has become possible. Further, due to advances in optical matrix switches, wavelength selective switches, and other optical switching devices using MEMS technology, path switching without converting optical signals to electrical signals has become possible. Due to these and other reasons, optical networks transmitting optical signals as they are without converting them to electrical signals from the optical transmitters to the optical receivers are being realized. Optical route switching nodes have been introduced for this purpose.

Figure 17:
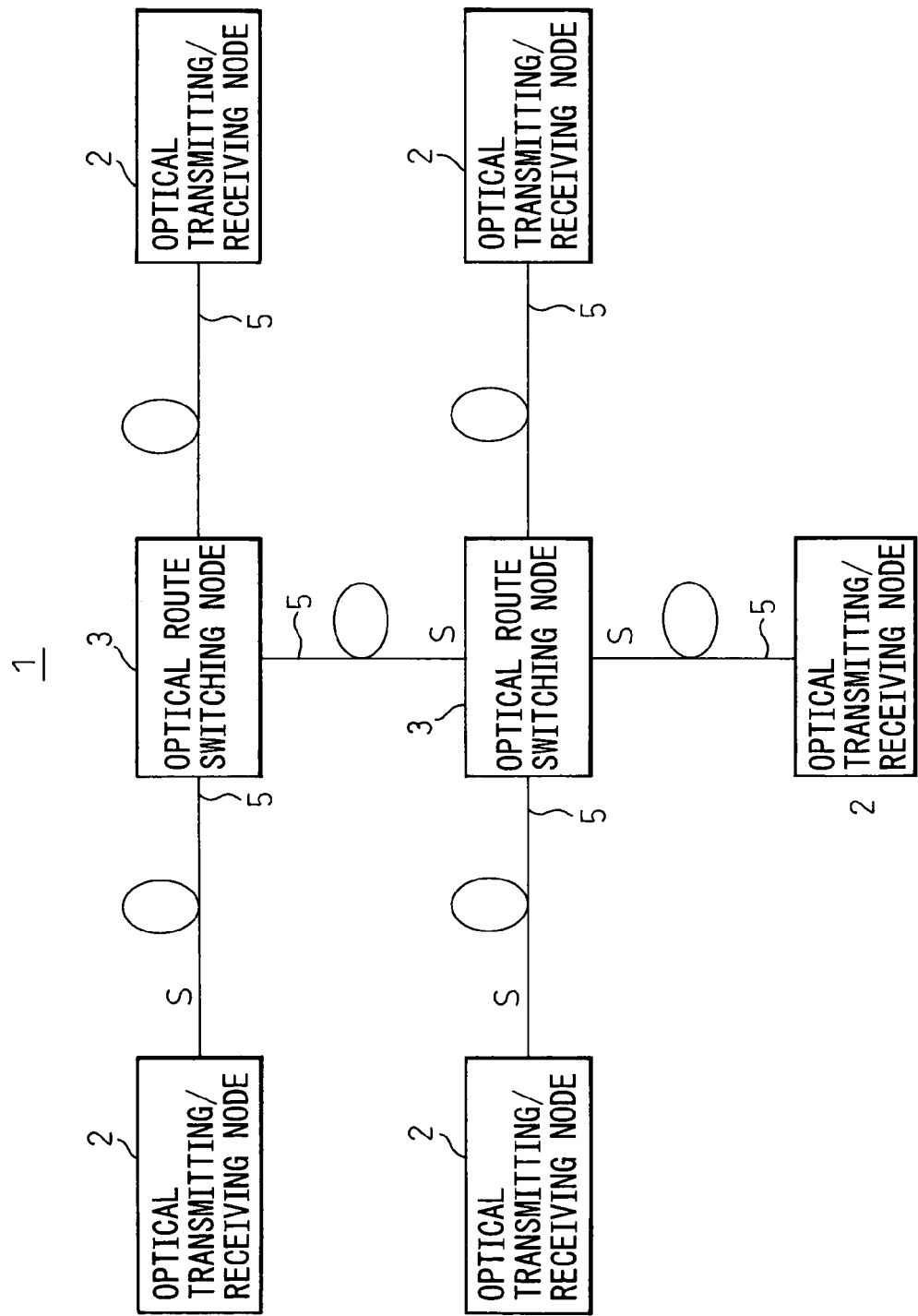
FIG. 17 is a view of an example of the configuration of an optical network system using optical route switching nodes.

FIG. 17 is a view of an example of the configuration of a known optical network system using the above optical route switching nodes. Note that components 1 to 5 in the drawing are substantially the same as components 1 to 5 in FIG. 1.

As the wavelength path monitoring technique in the optical network system 1 using optical route switching nodes 3 for switching optical routes in wavelength units instead of the electronic exchanges shown in FIG. 17, there are the techniques of the above prior art "A", "B", and "C". These however have the problems explained above. To further clarify these problems, a known optical network system upon which the present invention is predicated will be explained using the drawings.

Figure 18:
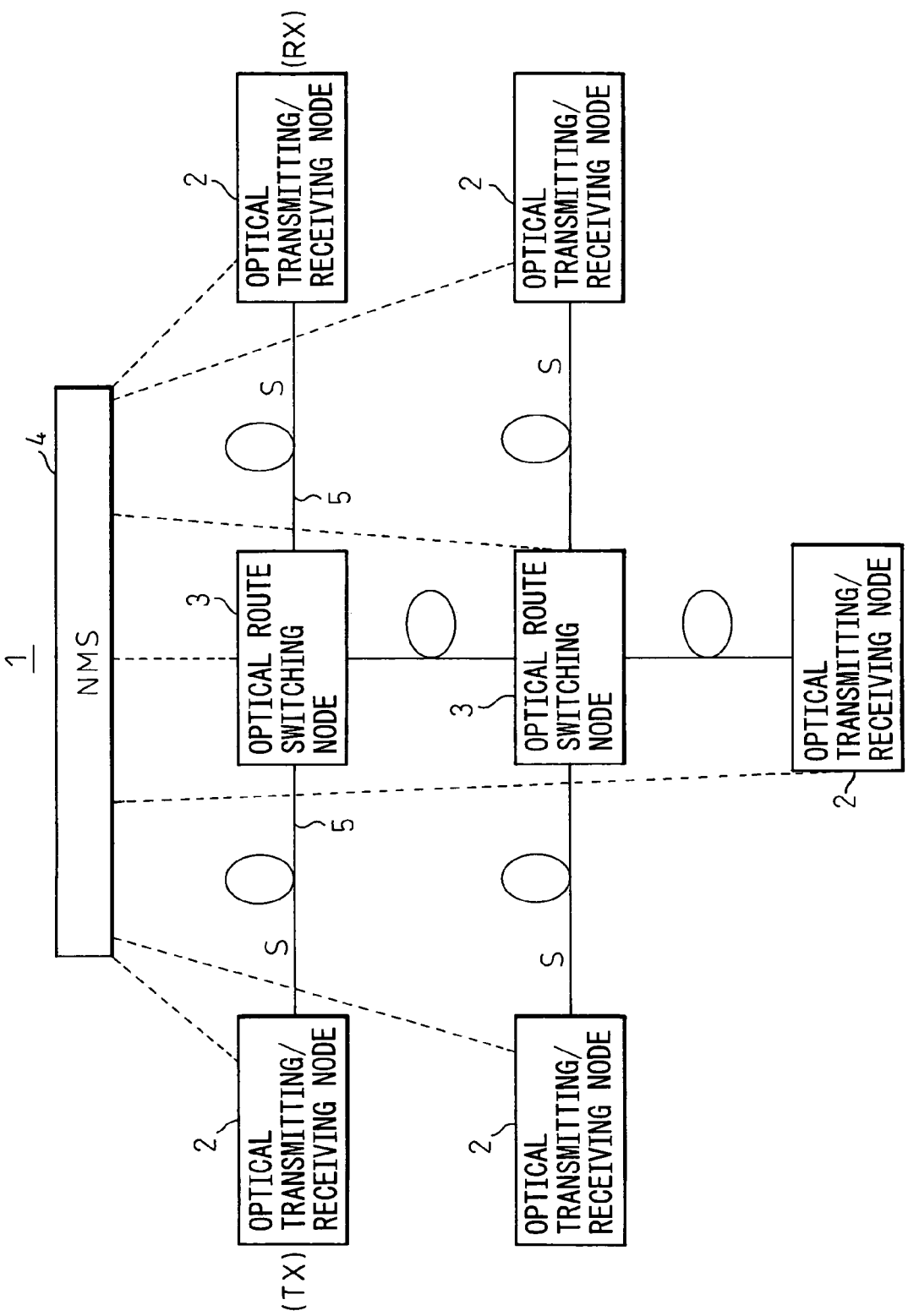
FIG. 18 is a view of an example of the configuration of a known optical network system using an NMS upon which the present invention is predicated.

FIG. 18 is a view of an example of the configuration of a known optical network system using an NMS upon which the present invention is predicated.

The already explained NMS is illustrated here as the block 4 for the first time. This NMS 4 manages the optical transmitting/receiving nodes 2, the optical route switching nodes 3, and the optical transmission lines 5 and flexibly operates the network as a whole. The optical transmitting/receiving nodes 2 and the optical route switching nodes 3 are connected to the NMS 4. The monitoring control signals to the nodes can therefore be centrally managed at the NMS 4.

An optical network system using the wavelengths of the optical signals S as path units controls switching of the optical route in these wavelength path units. The optical network system 1 monitors a wavelength path using the above-mentioned OSM's. This will be explained in the figures.

Figure 19:
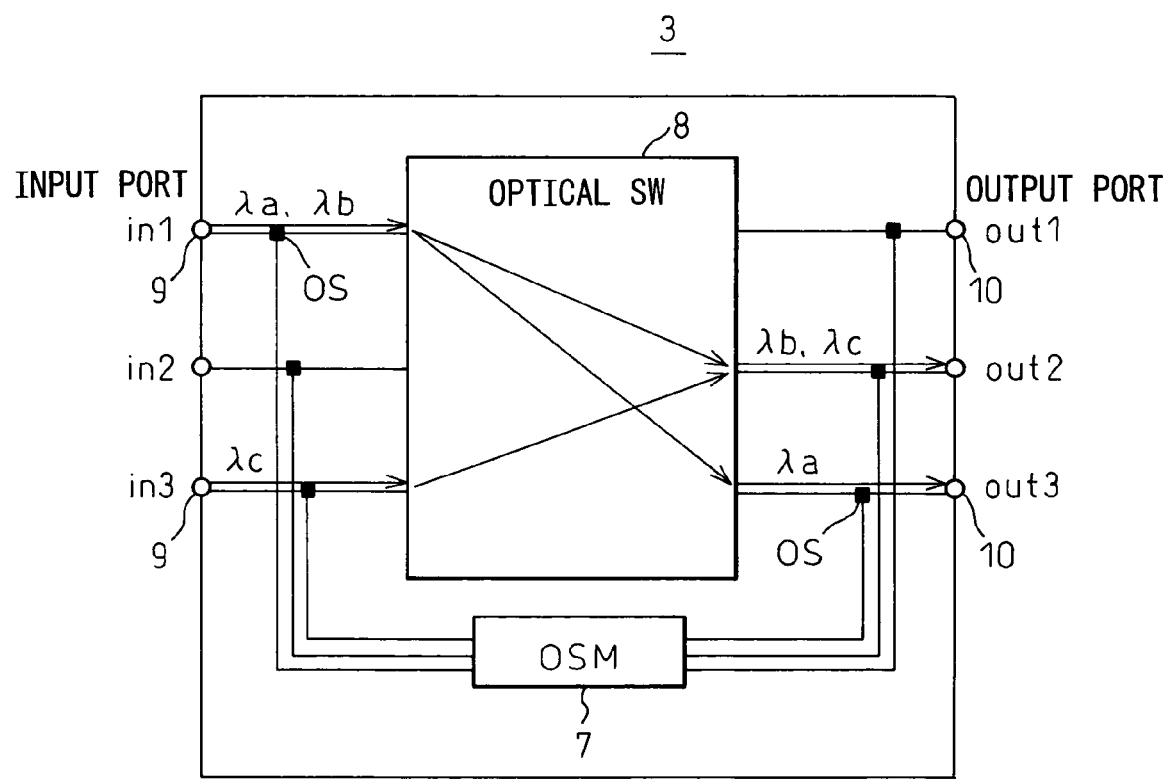
FIG. 19 is a view of an example of wavelength path monitoring using OSM.

FIG. 19 is a view of an example of monitoring of a wavelength path using the above OSM's. It shows an OSM 7 provided in any one optical route switching node 3.

The main component of an optical route switching node 3 is an optical switch (SW) 8. This optical switch 8 switches the routes of optical signals of different wavelength paths input from the input ports 9 and transmits them from the predetermined output ports 10. In the figure, the example of provision of three input ports 9-in1, in2, and in3 and three output ports 10-out, out2, and out3 is shown. The example is shown of receiving as input two optical signals of wavelengths λa and λb from the input port 9-in and receiving as input an optical signal of the wavelength λc from the input port 9-in3 and outputting the optical signals of the wavelengths λb and λc and outputting the optical signal of the wavelength λa from the output port 10-out3 in accordance with predetermined route switching information.

The OSM 7 monitors what wavelengths of optical signals are input to the input ports 9 and what wavelengths of optical signals are output from the output ports 10. For example, it receives parts of the optical signals of the ports split off by optical splitters (OS).

When the wavelengths of the optical signals input to the optical route switching nodes 3 are all different like in the illustrated example, the OSM 7 may be used to monitor the wavelength information at the input/output ports 9 and 10 of the node 3 so as to confirm the states of connection of wavelength paths in the node relatively easily (see above prior art "A").

Further, by comparing the network configuration information acquired in advance by the NMS 4 and the node internal wavelength path connection information collected from the nodes 3, it is possible to realize tracking of wavelength paths.

However, as already explained in the above (a), there may be a plurality of wavelength paths with the same wavelength in different optical transmission lines 5 in an optical network system. That is, in an optical route switching node 3, sometimes wavelength paths of the same wavelength will be connected from different ports. At this time, it would not be possible to discriminate among different wavelength paths of the same wavelength by just monitoring the wavelength information. Therefore, sometimes it will not be possible to detect erroneous connection of wavelength paths arising due to erroneous control of optical route switching or erroneous connection of optical transmission lines (fibers). This will be explained by the figures.

FIGS. 20B and 20C show two examples of the case of occurrence of erroneous connection of wavelength paths.

(a) First, FIG. 20A shows an example of correct connection. Here, the model of the wavelength path illustrated is one passing through two optical route switching nodes 3 (A, B) between transmitting (TX) side and receiving (RX) side optical transmitting/receiving nodes 2. That is, the path set for the wavelength λ is:

2(TX)→3(A)→3(B)→2(RX)

(b) Erroneous Connection Example 1 shows the case where the illustrated "erroneous control of switching" occurs due to erroneous operation of for example the optical switch 8 in the optical route switching node 3(A) in the above model.

At this time, the network is configured so that two optical signals of the same wavelength λ are input at the two input ports 9 of the optical route switching node 3(A) despite being of different optical transmission lines 5, 5'.

In such a network configuration, when the above "erroneous control of switching" occurs, sometimes erroneous paths different from FIG. 20A can end up being set such as shown in FIG. 20B. In such a case, while the wavelength path passing through the optical transmission line 5 should be connected to the input port of the next optical route switching node 3(B) (see FIG. 20A), a wavelength path passing through the other optical transmission line 5' ends up being erroneously connected to it.

In the end, in Erroneous Connection Example 1 of (b), it is not possible to detect erroneous connection between separate wavelength paths (5, 5') of the same wavelength (λ) (one of the above mentioned problems).

(c) Erroneous Connection Example 2 shows the case where the illustrated "erroneous connection of optical fibers" occurs due to for example human error between the optical route switching node 3(A) and the node 3(B) in the above-mentioned model.

When this happens, while the wavelength path passing through the optical transmission line 5 should inherently be connected to the input port of the optical route switching node 3(B) (see FIG. 20A), the wavelength path passing through the other optical transmission line 5' ends up being erroneously connected to it.

In the end, in Erroneous Connection Example 2 of (c), it is not possible to detect erroneous connection between separate wavelength paths (5, 5') of the same wavelength (λ) (same problem as above).

Below, the present invention will be explained in further detail. First, the characterizing feature and action of the present invention will be summarized, then specific embodiments will be explained.

The characterizing feature of the present invention is the utilization of the optical power, wavelength, polarization, optical signal-to-noise ratio (OSNR), that is, optical noise power, or other simple optical characteristic information as an identifier of a wavelength path to realize confirmation of connection of the wavelength path and tracking of the wavelength path between two optical transmitting/receiving nodes (TX-RX) in an optical network system 1 as a whole.

(I) First, the technique of confirmation of connection of the wavelength path and tracking of the wavelength path in the case where the NMS 4 has network configuration information of the optical network system 1 (already explained first aspect) will be explained. The technique comprises identifying the nodes 3 (monitored nodes) through which the wavelength path to be monitored passes and the port numbers of those nodes from the network configuration information at the NMS 4 and monitoring only those ports by notifying the monitored nodes. After this, it causes a change in for example the optical power as one of the above optical transmission characteristics at the optical transmitter of the wavelength path to be monitored, confirms the existence of the change of optical power in the monitored ports, and collects and analyzes this information at the NMS 4 so as to confirm the connection of the wavelength path and track the wavelength path as targeted between the two optical transmitting/receiving nodes (TX-RX).

(II) Next, the technique of confirmation of connection of the wavelength path and tracking of the wavelength path in the case where the NMS 4 does not have network configuration information of the optical network system 1 (already explained second aspect) will be explained. First, the technique comprises causing a change in for example the optical power as one of the above optical transmission characteristics at the optical transmitter of the wavelength path to be monitored and monitoring the existence of the change of the optical power so as to limit the nodes 3 through which the monitored wavelength path passes and their ports from the optical network system as a whole. It then stops the change of the optical power for only those ports, then causes a change in the optical power again. It utilizes the fact that the timing of change of the optical power appearing will differ for each node due to the delay in propagation for each node occurring when the second change of optical power is propagated and collects and analyzes that timing information at the NMS 4 so as to track the wavelength path targeted. The action of the present invention may be summarized as below.

In general, the technique is employed of collecting and analyzing the wavelength path connection information for all nodes present in an optical network system as a whole. Compared with this technique, by having the NMS 4 collect and analyze the connection information for only monitored nodes and monitored ports in advance as in the present invention, it is possible to confirm connection of a wavelength path and track a wavelength path at a relatively high speed.

Further, even when the NMS 4 does not have the above network configuration information, it is possible to confirm connection of a wavelength path and track a wavelength path. Further, the technique of confirming connection of a wavelength path and tracking a wavelength path according to the present invention uses as the identifier of a wavelength path the optical power, wavelength, polarization, optical noise power, or information of other basic optical characteristics of an optical signal able to be obtained when monitoring optical transmission characteristics. Therefore, there is the advantage that there is no longer a need to add any special hardware just for monitoring the wavelength path, space is saved, and cost is lowered. Further advantages include the nonreliance on the bit rate or format of the optical signal and the almost complete lack of need for hardware compatibility among vendors.

Next, embodiments of the present invention will be explained. First, means common to the first aspect and the second aspect of the invention will be shown in the drawings.

Figure 2:
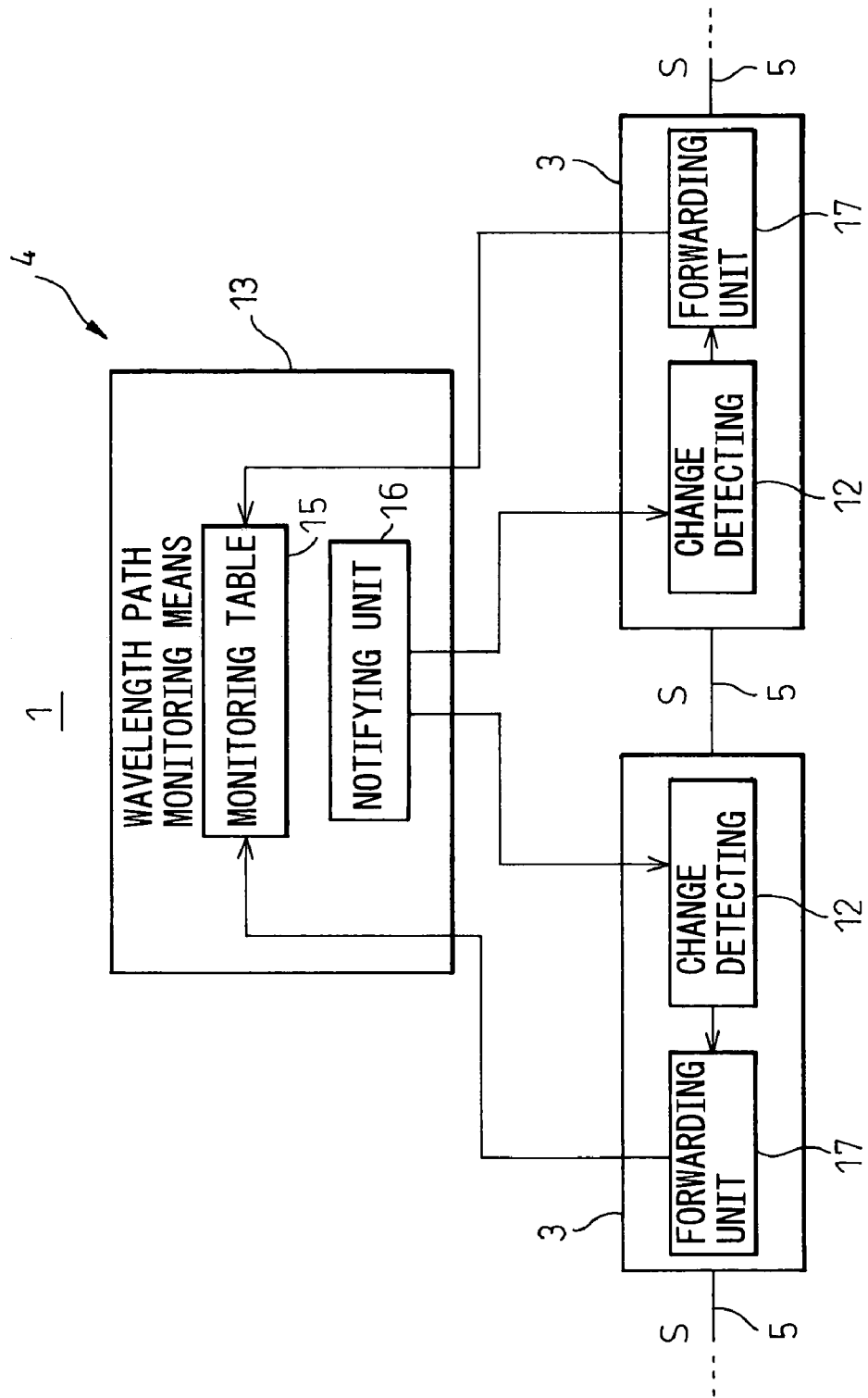
FIG. 2 is a view of common means for realization of first and second aspects according to the present invention.

FIG. 2 is a view of means for realization of the invention common to the first and second aspects of the invention. This figure shows part of the configuration of FIG. 1. However, the change detecting means 12 of FIG. 1 is incorporated into each of the optical route switching nodes 3.

First, looking at the wavelength path monitoring means 13 in the NMS 4, this is provided with a monitoring table 15 and a notifying unit 16. The functions of the monitoring table 15 and notifying unit 16 are as follows. Note that the monitoring table 15 differs in function between the first aspect of the invention (aspect where NMS 4 holds network configuration information in advance) and the second aspect of the invention (aspect where NMS 4 does not hold such network configuration information).

First, the monitoring table 15 (I) of the first aspect of the invention has the function of recording and storing the monitored optical route switching nodes 3 through which a wavelength path passes and the input ports 9 and output ports 10 of those nodes extracted based on the network configuration information.

On the other hand, the monitoring table 15 (II) of the second aspect of the invention has the following function. As explained above, the NMS 4 first determines the wavelength path to be monitored, then causes a change in one of the optical transmission characteristics, for example, the optical power, by the transmitting end office of the wavelength path, and identifies the plurality of optical route switching nodes at which the change in optical power is detected. The monitoring table 15 (II) records information linking the identified optical route switching nodes and their times of start of detection of the change.

Next, looking at the notifying unit 16 and the forwarding unit 17 in FIG. 2, these units (16, 17) have substantially the same functions in both the first aspect of the invention and the second aspect of the invention.

The notifying unit 16 has the function of notifying the monitored optical route switching nodes 3 that they should report the results of detection of change by their change detecting means 12. On the other hand, the forwarding means 17 perform the function of forwarding the results of detection of change from the optical route switching nodes 3 to the NMS 4.

Below, preferred embodiments of the present invention will be explained. Note that an example of use of optical power as the optical transmission characteristic to be changed will be explained.

(I) First Aspect (NMS 4 Holds Network Configuration Information)

Figure 3:
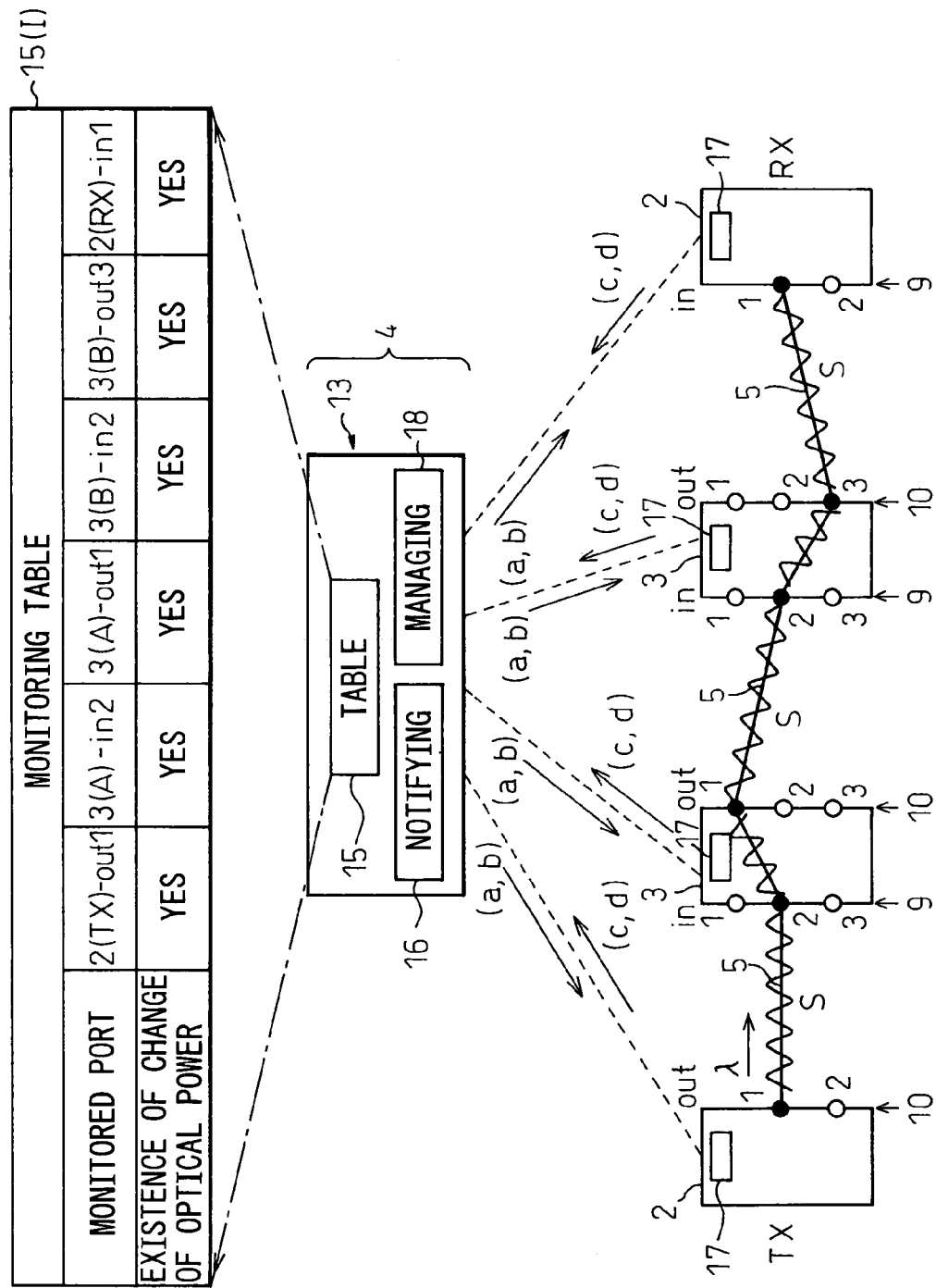
FIG. 3 is a view of an example of wavelength path monitoring in the first aspect according to the present invention.

FIG. 3 is a view of an embodiment of wavelength path monitoring in the first aspect of the present invention. Note that the model in this figure is made to match with the model of FIG. 20 explained above. Therefore, the lower part of FIG. 3 is the same as FIG. 20A. An optical signal S is sent from a transmitting side optical transmitting/receiving node 2 (TX) shown at the bottom toward a receiving side optical transmitting/receiving node 2 (RX) along an optical transmission line 5. During that interval, the wavelength path (λ) passes through the optical route switching nodes 3(A) and 3(B).

The wavelength path monitoring means 13 of the NMS 4 and the nodes (2, 3) have communication lines (shown by dotted lines) laid between them. Information for
- notification of monitored ports (a),
- notification of start of change of optical power (b),
- notification of existence of change of optical power (c), and
- notification of end of change of optical power (or restoration work) (d)

is transferred between the notifying unit 16 and the forwarding units 17.

Due to mainly the notification of monitored ports (a) and the notification of existence of change of optical power (c) among these, the content of the monitoring table 15 (I) is confirmed. In the example of the monitoring table 15 (I) of this figure, when a change of the optical power is propagated over a wavelength path of output port (10)out1 of node 2 (TX)→input port (9)in-2 of node 3(A)→output port (10out1 of node 3(A)→ . . . →input port (9)in1 of node 2 (RX), this shows that the change of the optical power has been confirmed at each of the above ports.

Figure 4B:
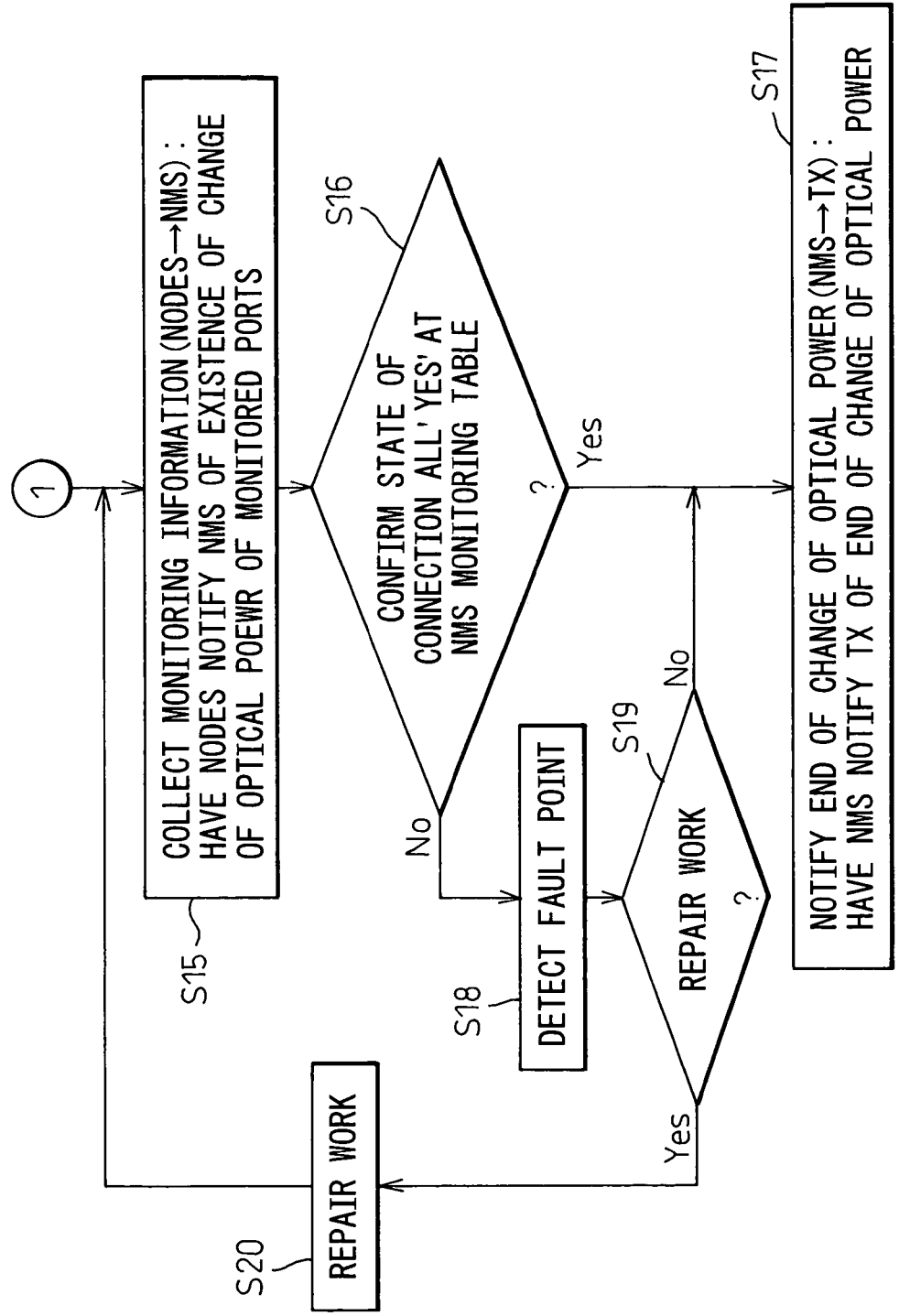

FIGS. 4A and 4B are flow charts of the routine for tracking a wavelength path in the model of FIG. 3. FIG. 3 will be explained while referring to the flow charts of these figures.

In the embodiment of FIG. 3, only the nodes through which the wavelength path to be monitored and the ports of those nodes are set to be monitored in advance. Further, the optical transmitter of the wavelength path is made to cause a change in the optical power and the existence of the change in the optical power is confirmed in the monitored port. This enables confirmation of connection of the wavelength path and tracking of the wavelength path. This routine will be explained below.

<1> Determine wavelength path for confirmation of connection of wavelength path and tracking of wavelength path (step S11 of FIG. 4A)

<2> Have NMS 4 prepare monitoring table 15 (I) recording nodes to be monitored and input ports in and output ports out of the monitored nodes (S12)

<3> Have NMS 4 select nodes through which wavelength path passes and input ports and output ports of the nodes from the network configuration information and monitor the selected nodes 3 and ports (9, 10) by having the NMS 4 notify those nodes 3 (S13)

<4> Have NMS 4 send to the optical transmitting end office (node 2 (TX)) of the wavelength path for confirmation of connection of the wavelength path and tracking of the wavelength path a control command ordering it to temporarily change the optical power of the optical signal S (S14). Note that for the control for changing the optical power, it is possible to use the transmitting light source of the transmitter of the wavelength path or a variable optical attenuator (VOA) for preemphasis provided at the optical transmitting end office. This will be explained later in FIG. 11 and FIG. 12.

<5> Having the monitoring points designated at the above <3> use OSM's to monitor for a change in the optical power and notify the NMS 4 of any change in the optical power and have the NMS 4 record any change in the optical power in the monitoring table 15 (I).

<6> When confirming there is a change in the optical power at all of the monitoring points at <5> (YES at S16), ending the tracking of the wavelength path since correct connection of the wavelength path has been confirmed.

<7> Then, having the NMS 4 notify the node 2 (TX) serving as the optical transmitting end office to end control for changing the optical power (S17). This completes the confirmation of connection of the wavelength path.

<8> When not being able to confirm "YES" at all monitoring points at <6> (NO at S16), the NMS 4 detects a fault point since a fault has occurred somewhere (S18).

<9> After detecting the fault point, work is begun to repair (restore) that part. If that work is not possible (NO at S19), the routine proceeds to S17. On the other hand, if that work is possible (YES at S19), the repair work is started (S20). After restoration from the fault, the routine returns to S15 where a similar operation is restarted. Below, two examples of detection of a fault point will be explained with reference to the drawings.

FIG. 5 is a view of a first example of detection of a fault point. This figure corresponds to the Erroneous Connection Example 1 of FIG. 20B. FIG. 6 is a view of a second example of detection of a fault point. This figure corresponds to the Erroneous Connection Example 2 of FIG. 20C.

In FIG. 5, a switching error occurs at the optical switch (8 of FIG. 19) at the node 3 (A). The change in optical power therefore does not appear from the output port (10)out1 of the node 3(A) on. On the other hand, at FIG. 6, a connection error of the optical fiber occurs at the node 3(B). The change in optical power therefore does not appear from the input port (9)in2 of the node 3(B) on. Therefore, it is judged that the points where the change of the optical power does not appear are fault points.

That is, when change of the optical power cannot be detected at a monitored node and input port (9) of that monitored node recorded in the monitoring table 15 (I), it means that a fault (erroneous connection) has occurred on the path before that node. When a change of the optical power cannot be detected at the output port (10) of the node, it means that a fault (erroneous connection) has occurred in that node.

The embodiment explained with reference to FIG. 3 to FIG. 6 above showed the routine for monitoring a wavelength path in the first aspect of the present invention. In this embodiment, when optical powers of the same wavelength input at the same node from different ports simultaneously change, however, the confirmation of connection of the wavelength path and tracking of the wavelength path are not possible. Therefore, it is necessary to change the optical power of only the wavelength (λ) to be measured. Accordingly, the NMS 4 manages each optical transmitting end office (node 2) present in the optical network system 1 by a managing unit 18 (see FIG. 3), confirms by the managing unit 18 that the optical power of the same wavelength has not changed on the network, then sends the optical transmitting end office (node 2) a control command ordering it to change the optical power. This managing unit 18 is also employed in the later explained embodiment of the second aspect of the invention.

That is, the managing unit 18 manages the system so that when there are a plurality of wavelength paths the same in wavelength of the optical signals transferred over them but differing in optical routes present in the optical network system 1, simultaneous change given to the wavelength paths is prevented.

On the other hand, by simultaneously changing the optical power of different wavelengths, it would be possible to simultaneous confirm connections and track a plurality of wavelength paths having different wavelengths. Further, it is also possible to use as wavelength path identifiers not only a change of the optical power, but also a change of wavelength, a change of polarization, or a change of optical noise power.

In the embodiment of the first aspect of the invention, since the technique comprises specifying the nodes to be monitored and the input/output ports of the monitored nodes in advance from the network configuration information held by the NMS 4, then confirming the connections of the wavelength path and tracking the wavelength path, there is no need for monitoring all of the ports (9, 10) of all of the nodes (2, 3) in the optical network system. Therefore, it is possible to greatly reduce the monitoring points and monitor at a high speed. Further, since the identifiers of the wavelength paths used are the optical power, wavelength, polarization, or other basic optical characteristics, compared with the case of use of the pilot tone like in the prior art "C", there is no need for dedicated hardware for monitoring control, for example, modulators and demodulators for the pilot tone. Accordingly, this embodiment is superior to the prior art in the points of scale of hardware and cost.

(II) Second Aspect (NMS 4 does not Hold Network Configuration Information)

Figure 7:
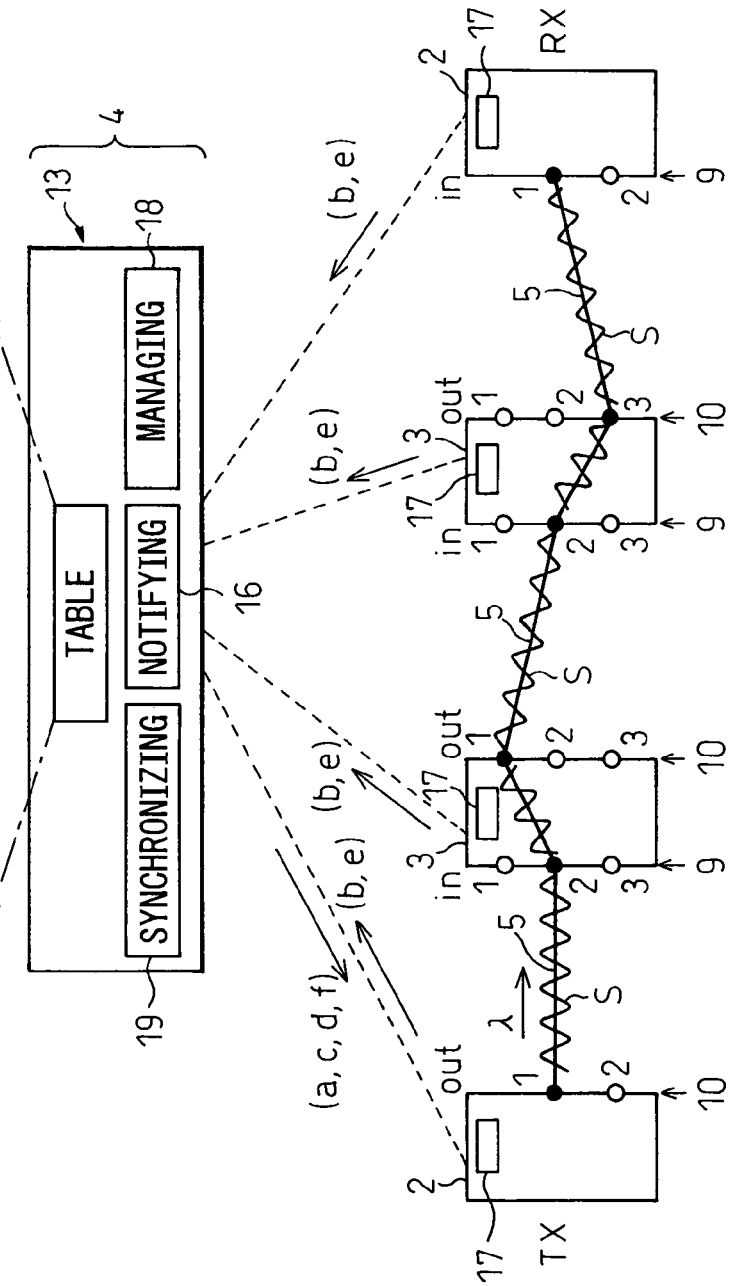
FIG. 7 is a view of an embodiment of wavelength path monitoring in the second aspect of the present invention.

FIG. 7 is a view of an embodiment of wavelength path monitoring in the second aspect of the present invention. Note that the model in this figure is made to match with the model of FIG. 20 explained above. Therefore, the lower part of FIG. 7 is the same as FIG. 20A. An optical signal S is sent from a transmitting side optical transmitting/receiving node 2 (TX) shown at the bottom toward a receiving side optical transmitting/receiving node 2 (RX) along an optical transmission line 5. During that interval, the wavelength path (λ) passes through the optical route switching nodes 3(A) and 3(B).

The wavelength path monitoring means 13 of the NMS 4 and the nodes (2, 3) have communication lines (shown by dotted lines) laid between them. In the downward direction, information for
  notification of start of change of optical power (a),
  notification of end of change of optical power (c),
  notification of restart of optical power (d), and
  notification of end of change of optical power (or restoration work) (f), is transferred from the notifying unit 16 to the nodes, while in the upward direction, information for
  notification of detection of change of optical power (b) and
  notification of time of detection of change of optical power (e)

is sent from the forwarding units 17 to the NMS 4.

Due to mainly the notifications (b) and (e), the content of the monitoring table 15 (I) is confirmed.

FIGS. 8A and 8B are flow charts of the routine for tracking a wavelength path in the model of FIG. 7. FIG. 7 will be explained while referring to the flow charts of these figures. Note that FIG. 8A shows the process for confirming the nodes through which the wavelength path passes, that is, "confirmation of connection", while FIG. 8B shows the process for identifying the nodes through which the wavelength path passes, then specifying at what order the nodes are connected along the wavelength path, that is, "confirmation of order of connection".

The embodiment of FIG. 7 shows the technique of confirmation of connection of the wavelength path and tracking of the wavelength path in the case of introducing new hardware etc., that is, the case where the NMS 4 does not have network configuration information such as connection information between the nodes (2, 3) and the optical fibers (5).

In this case, in addition to confirmation of connection of the wavelength path and tracking of the wavelength path, it is necessary to confirm the optical fiber connection information between nodes not recognized by the NMS 4. Note that in confirmation of connection of the wavelength path, tracking of the wavelength path, and confirmation of the optical fiber connection state, the nodes (2, 3) and the NMS 4 can communicate with each other. Further, it is necessary that the times at the nodes be completely synchronized through the NMS 4. This routine will be explained below while referring to FIGS. 8A and 8B.

<1> Determine wavelength path for confirmation of connection of wavelength path and tracking of wavelength path (step S21 of FIG. 8A)

<2> Have NMS 4 issue to node 2 (TX) serving as optical transmitting end office of wavelength path control command ordering it to change optical power of optical signal S (S22)

<3> Use OSM's to monitor for change in optical power for all ports of all nodes in optical network system 1. When detecting change of optical power, notify that node and port of that node to NMS 4 (S23).

<4> Send node 2 (TX) serving as optical transmitting end office of wavelength path to be monitored command to stop control for changing the optical power (S24).

<5> Store information on nodes and ports of nodes detecting change of optical power based on results of <3> in monitoring table 15 (II) in NMS 4 (S25).

<6> Use time synchronizing means 19 to synchronize times between all nodes covered and NMS 4 (S26).

<7> Have NMS 4 notify nodes to be monitored to monitor nodes and ports of nodes recorded in monitoring table 15 (II) of <5> and have NMS 4 send to node 2 (TX) serving as optical transmitting end office of wavelength path to be monitored control command ordering it to change power of optical signal (S27).

<8> Have each node monitor time of start of change of optical power and notify that time to NMS 4 (S28).

<9> Have NMS 4 confirm order of connection of nodes 3 from node 2 (TX) to node 2 (RX) based on times of change of optical power (see the table 15 (ii) of FIG. 7) collected by <8>. This completes the network configuration information.

Note that processes <8> and <9> and steps S18, S19, and S20 of FIG. 4B in the first aspect of the invention, that is, the routines for detection of fault points and restoration from faults may be applied as they are to the second aspect of the invention.

The embodiment explained above with reference to FIG. 7 and FIGS. 8A and 8B show the routine for monitoring the wavelength path in the second aspect of the present invention. This embodiment is characterized by acquisition of connection information among nodes utilizing the delay time of propagation of the optical signal S. Therefore, the time synchronizing means 19 is one of the important components. FIG. 7 showed the time synchronizing means 19 inside the NMS 4, but it may also be provided at a position other than the NMS 4. Wherever the position, it is important to provide a time synchronizing means 19 for synchronizing the time in the optical route switching nodes 3 and the time in the wavelength path monitoring means 13.

Here, the synchronization of times among the nodes (2, 3) may be realized with an error of a few microseconds by using a global positioning system (GPS). There is also a technique not using a GPS. That is, the NMS 4 simultaneously sends signals to the nodes (2,3), and the nodes 2, 3 receiving the signals send return signals to the NMS 4. The times when the return signals from the nodes reach the NMS 4 are managed and the delay in propagation between the NMS 4 and the nodes (2, 3) is corrected for to enable high precision synchronization of time among nodes.

According to the above embodiment (FIG. 7 and FIGS. 8A and 8B), the wavelength path monitoring means 13 collects information of the times of start of detection of a change by the change detecting means 12 (S28 of FIG. 8B), determines the order of connection of the optical route switching nodes 3 specified by S21 to S23 of FIG. 8A along the wavelength path (S29 of FIG. 8B), and thereby can confirm connection and track the wavelength path.

In the above embodiments, the explanation was given of a temporary change in the optical transmission characteristics taking as an example the optical power among the different optical transmission characteristics, but as explained above it is also possible to use as the change of the optical characteristics a change of the wavelength, a change of the polarization, a change of the optical noise power, etc.

Regarding the change of wavelength and change of polarization in the various optical transmission characteristics, such a change is propagated with almost no variation from the transmitting side node 2 (TX) to the receiving side node 2 (RX) regardless of the number of the nodes 3 in the middle.

Regarding the change of the optical power, however, due to the presence of the optical amplifiers (22) in the optical network system, the information of the change of optical power may gradually be lost along with propagation of the optical signal S. This is due to the automatic level control (ALC) function for maintaining the output of an optical amplifier at a desired level and the automatic gain control (AGC) function for imparting a certain gain to the optical signal input. To prevent information of the change of the optical power to be gradually lost in this way, the following measures may be devised.

Such measures are required when there are optical amplifiers amplifying the optical signal S and operating by ALC in the optical network system 1 and the change generating means 11 is a means for generating a change of optical power as the change of the optical transmission characteristics. In this case, (i) In the first measure, the change generating means 11 generates the change in optical power by a speed faster than the response speed of ALC.

(ii) In the second measure, the optical amplifiers are switched from ALC to AGC at the time of start of operation of the wavelength path monitoring means 13, and the change generating means 11 generates the change in optical power by a speed slower than the response speed of AGC.

Note that an example of such an optical amplifier is shown by reference numeral 22 in the later mentioned FIG. 9 and FIG. 10.

In the first measure, if the change in power occurs by a speed faster than the response speed of the ALC, the ALC will not affect the change in power and the change in power will therefore not end up becoming smaller.

On the other hand, in the second measure, if the change in power occurs by a speed slower than the response speed of the AGC, the AGC will affect the change in power and the change in power will therefore not end up becoming smaller.

Further, as a third measure, it is possible to use a variable optical attenuator (VOA) to restore the change in optical power being lost. This is shown in the drawings.

Figure 9:
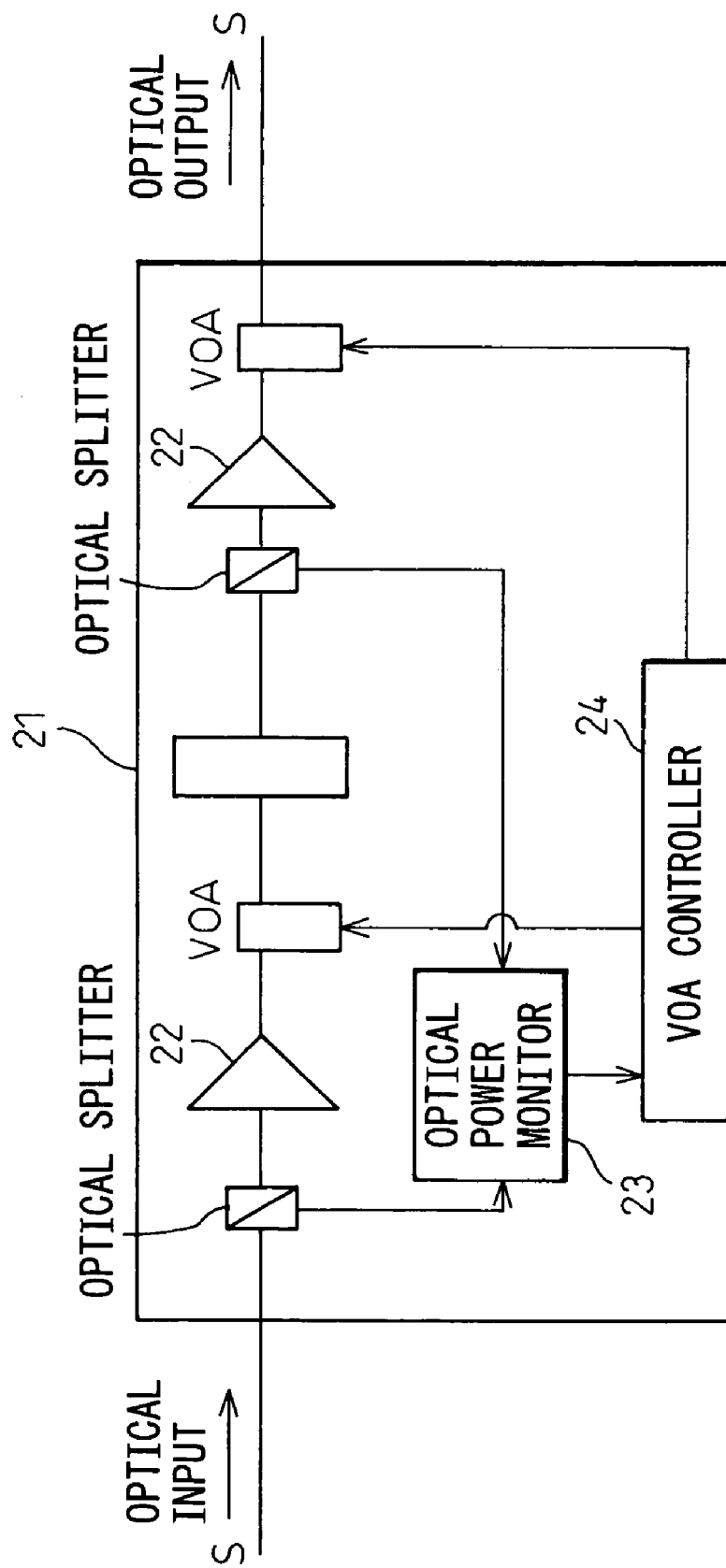
FIG. 9 is a view of an example of recovery of optical power change using a VOA (1)
Figure 10:
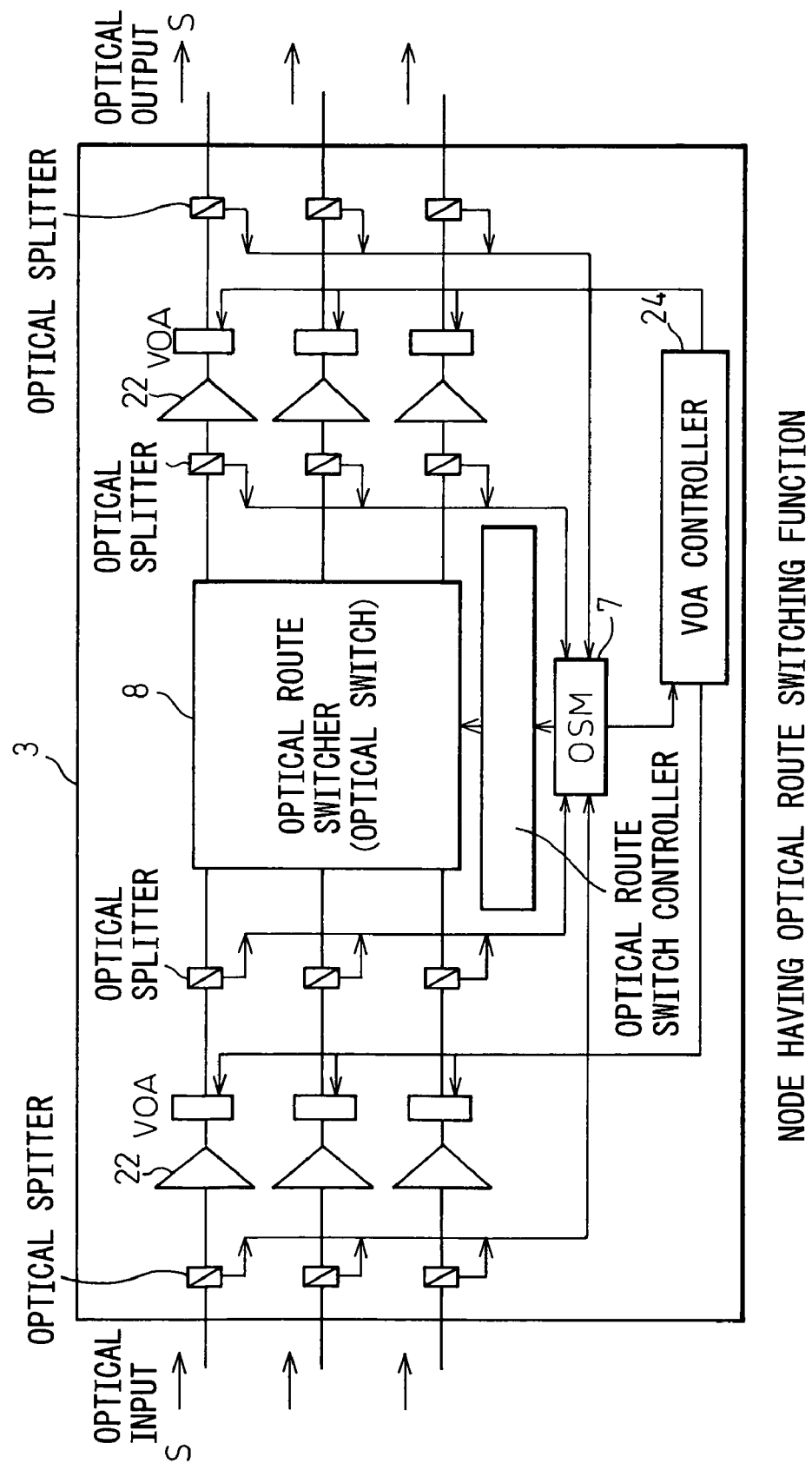
FIG. 10 is a view of an example of recovery of optical power change using a VOA (2)

FIG. 9 is part one of a view of an example of recovery of change of optical power using a VOA, while FIG. 10 is part two of a view of an example of recovery of change of optical power using a VOA. The node in FIG. 10 corresponds to an above-mentioned optical route switching node 3. On the other hand, the node in FIG. 9 corresponds to a so-called optical amplifying and relaying node of an optical system. This latter one is suitably inserted into the optical transmission lines 5 between the nodes 2 and nodes 3 and the optical transmission lines 5 between adjoining nodes. 3.

In FIG. 9, reference numeral 21 is an optical amplifying and relaying node. Optical input (S) passes through the two optical amplifiers 22 in the figure and in accordance with need a dispersion compensation module (DCM) to become reproduced optical output (S) which is then sent to the next node. In this case, the optical splitters (input side and output side) split the optical signal and input the optical power to an optical power monitor 23. In accordance with the optical power detected here, the VOAs (input side and output side) are controlled through a VOA controller 24 to reproduce the change in optical power. This is shown in FIG. 10. The same applies in an optical route switching node 3 having an optical route switch (same as optical switch 8 of FIG. 19).

Explaining this in further detail, the optical power of a WDM signal, that is, the optical signal S, is measured at the input end of the input side optical amplifier 22 to determine the presence of any change of the optical power. If recognizing a change, the NMS 4 or equipment management systems (EMS, not shown) of the management function in the nodes (21, 3) notifies this change of the optical power. Here, the speed of the change of the optical power is a value sufficiently smaller than the response speed of ALC. The optical power of the WDM signal S does not change at the output end of the optical amplifier 22. Further, if receiving a control command from the NMS 4 or EMS for maintaining the change in optical power, the VOA at the output end of the input side optical amplifier 22 is used to control the optical power of the WDM signal S. Control the same as this control is also performed at the output side.

When using the change in optical power to confirm connection and track a wavelength path in this way, the transmission characteristics deteriorate quite a lot. It is possible to conversely utilize this property and have the node 2 of the optical receiving end office (RX) use the B2 and B2 bytes of SONET/SDH, the number of corrections of error of the forward error correction (FEC) of the digital wrapper (DW), etc. Further, it is possible to monitor the margins of the current optical network system 1 based on this monitoring information or detect signs of occurrence of faults by the history of the monitoring information.

In the present invention, as explained above, giving a temporary change to one of the basic optical transmission characteristics of the optical signal S (or combination of two or more) is an important point, so specific examples of imparting such a change will be shown below in order for a change of optical power, a change of wavelength, a change of polarization, and a change of optical noise power.

Figure 11:
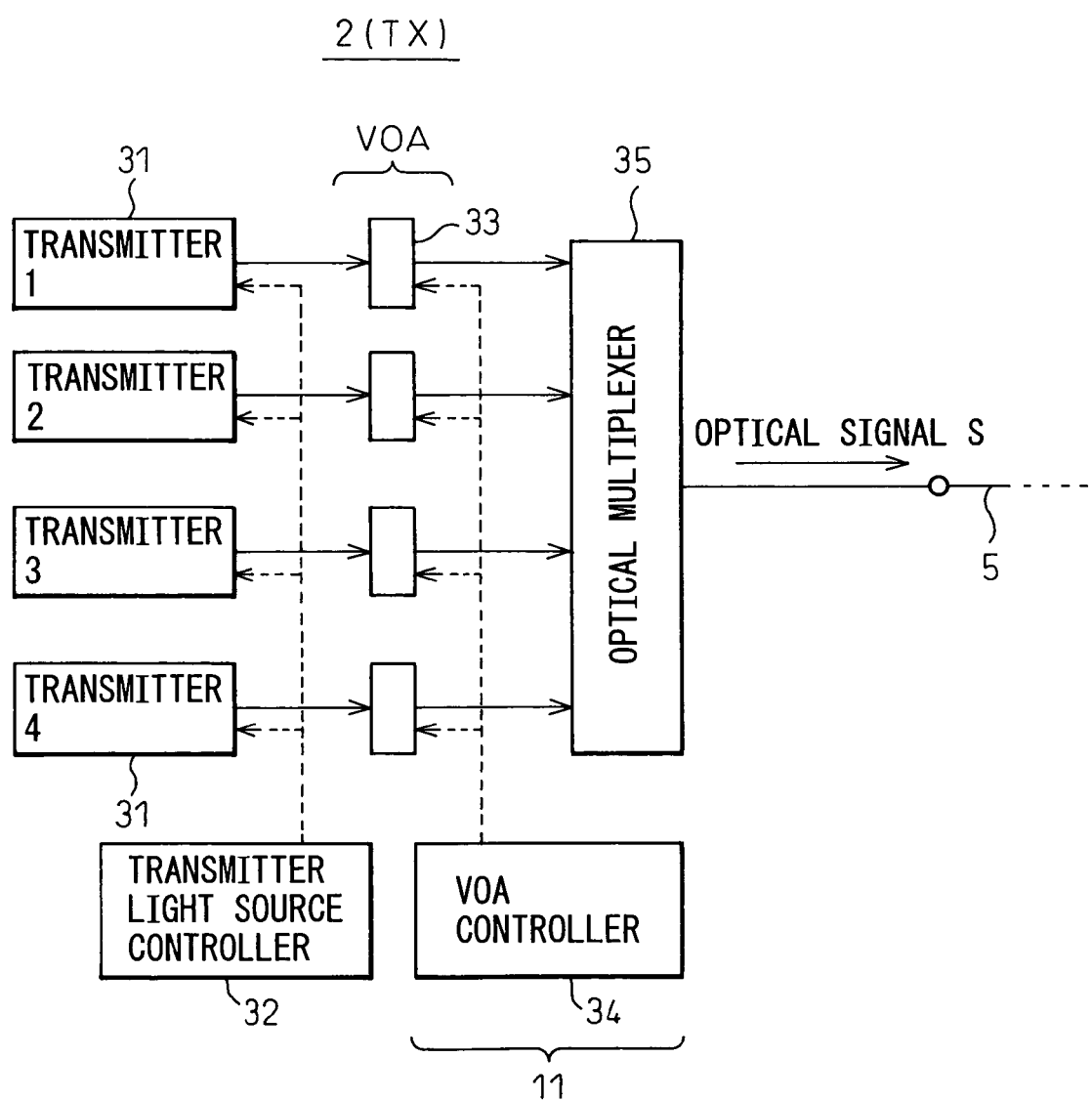
FIG. 11 is a view of an example of an optical power change imparting means.

FIG. 11 is a view of an example of an optical power change imparting means and corresponds to the optical transmitting node 2 (TX) including the change (change of optical power) generating means 11 explained above.

In this figure, 31 is a transmitter housing a light source (LD). In the illustrated example, four transmitters (1 to 4) are described corresponding to four wavelengths. If it is commanded from the NMS 4 for example to turn one of the transmitters on, a transmitter light source controller 32 drives the corresponding transmitter through the control lines shown by the dotted lines. Further, the optical signals of the different wavelengths from these transmitters 31 are combined by an optical multiplexer 35 and sent out to the next node as the WDM optical signal S contained in a single optical fiber.

In this figure, the change generating means 11 forms an optical power change imparting means. This imparting means is comprised of the VOA's 33 for the transmitters (31) and the VOA controller 34 for individually controlling the VOA's 33 through the control lines shown by the dotted lines. The state of change of optical power is shown in the figures.

FIG. 12 is a view of a first example (a) and a second example (b) of change of optical power. The ordinates in the graphs show the optical power, while the abscissas shown the time. Referring to FIG. 11 and FIG. 12A, the VOA controller 34 usually gives a predetermined loss (L1) to the optical output from a transmitter 31 by a VOA 33 and, when an optical power change generating command is output from the NMS 4, receives this command and gives a loss (L2) larger than L1 to the optical output to a VOA 33.

The method imparting this change of optical power may be reverse to the above as well. As shown in FIG. 12B, the VOA controller 34 may normally give a predetermined loss (L1) to the optical output from a transmitter 31 by a VOA 33 and, when an optical power change generating command is output from the NMS 4, receive this command and give a loss (L3) smaller than L1 to the optical output to a VOA 33.

Figure 13:
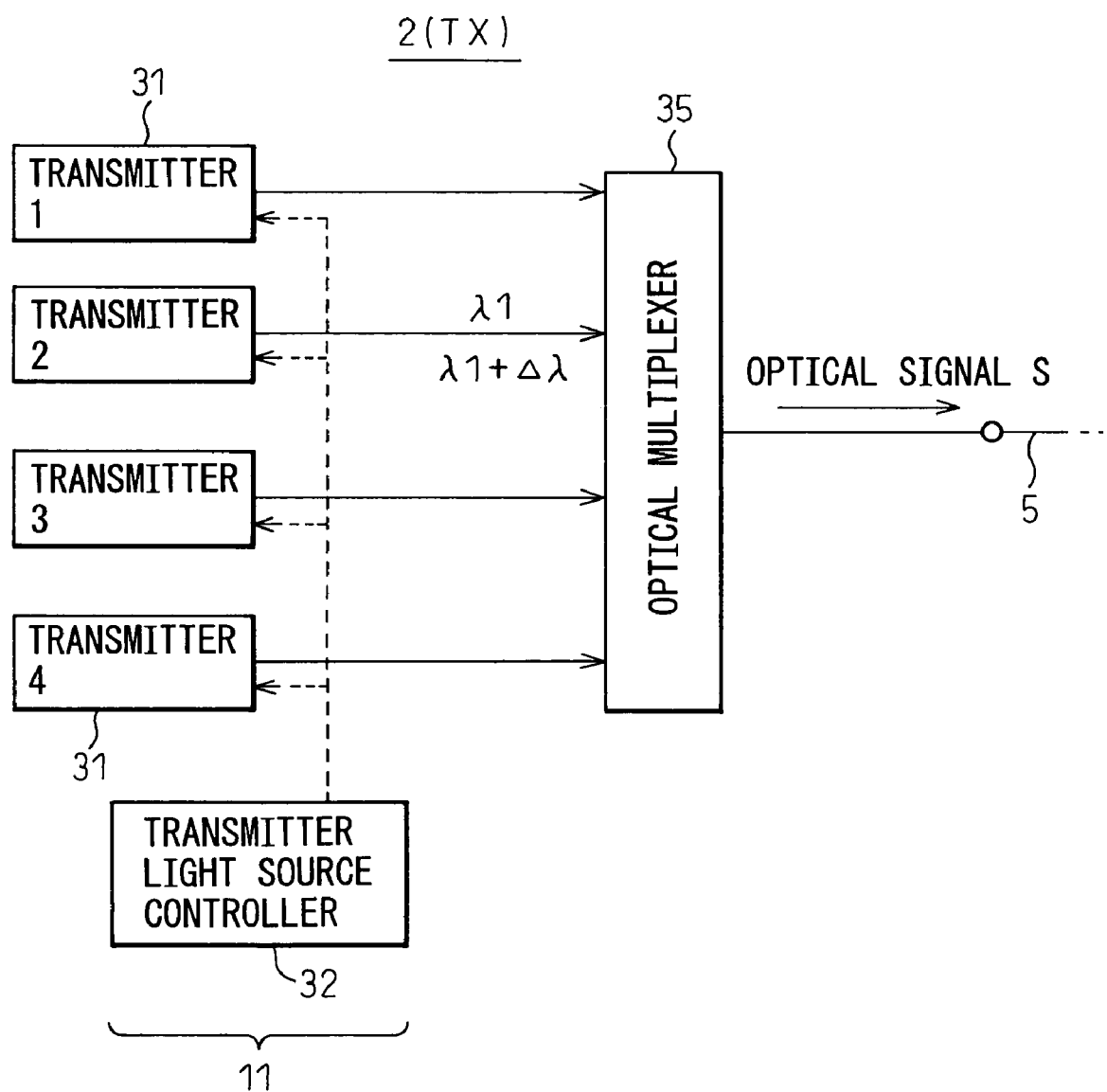
FIG. 13 is a view of an example of a wavelength change imparting means.

FIG. 13 is a view of an example of a wavelength change imparting means and corresponds to an optical transmitting/receiving node 2 (TX) including the above-mentioned change (wavelength change) generating means 11.

As explained above, the transmitters 31 house LD's. The optical output of these LD's (laser diodes) is temperature dependent. The wavelength of the optical output changes along with the change of temperature. Utilizing this, the transmitter light source controller 32 changes the temperature of the corresponding light source through the control line of the dotted line. For example, for a certain transmitter 31-2, normally it changes the wavelength of the optical output of the LD of the wavelength $\lambda 1$ by exactly a small wavelength change $\Delta\lambda$. In this case, like in FIGS. 12A and 12B, the magnitude of the wavelength may be $\lambda 1 > \lambda 1 + \Delta\lambda$ or $\lambda 1 < \lambda 1 + \Delta\lambda$.

Note that this change is wavelength is detected by the change detecting means 12 of each node, but the means 12 may also be realized by the above-mentioned OSM 7.

Figure 14:
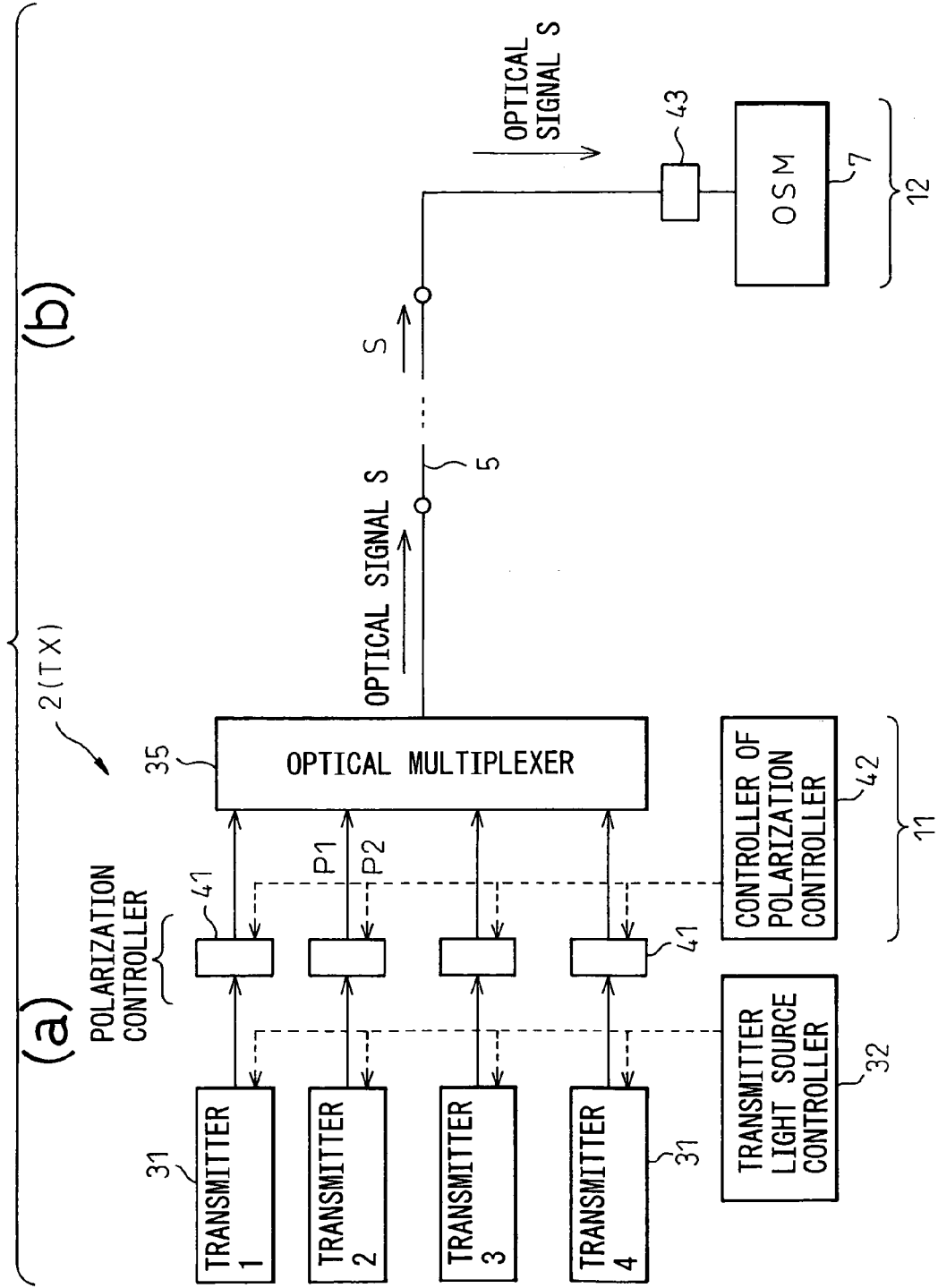
FIG. 14 is a view of an example of a polarization change imparting means (a) and a polarization change detecting means (b)

FIG. 14 is a view of an example of a polarization change imparting means (a) and a polarization change detecting means (b), where (a) corresponds to an optical transmitting/receiving node 2 (TX) including the above change (polarization change) generating means 11, while (b) corresponds to the above-mentioned change (polarization change) detecting means 12 provided in each optical route switching node 3.

In FIG. 14A, the change (polarization change) generating means 11 is comprised of polarization controllers 41 provided corresponding to the transmitters (31) and a controller of polarization controller 42 for individually controlling the polarization controllers 41 through the control lines shown by the dotted lines.

Each polarization controller 41 combines ¼ wavelength plates and ½ wavelength plates to freely control the polarization state of the optical wave. As examples of commercially available products, there are:

Compact powered polarization controller made by Oyokoden Lab Co., Ltd. (PSA-5000)

8169A polarization plate controller made by Agilent Technology

For example, a certain transmitter 31-2 normally has a polarization state of an angle of linear polarization of $\theta 1$ (P1) and at times of change is changed slightly to a polarization state of an angle $\theta 2$ (P2).

On the other hand, the change detecting means 12 of FIG. 14B is comprised of a newly introduced polarizer 43 and already explained OSM 7. The polarizer 43 has a fixed linear polarization angle ($\theta 0$). When the polarization angle is changed from the above $\theta 1$ to $\theta 2$, the optical power of the optical signal S passing through this polarizer 43 changes. By detecting this change of the optical power by the OSM 7, it is possible to obtain a grasp of the change in polarization. That is, the change in optical power converted from polarization modulation to optical power modulation is detected. With this technique, since the optical power itself is not directly changed, there is no deterioration of the transmission characteristics of the optical signal S.

Figure 15:
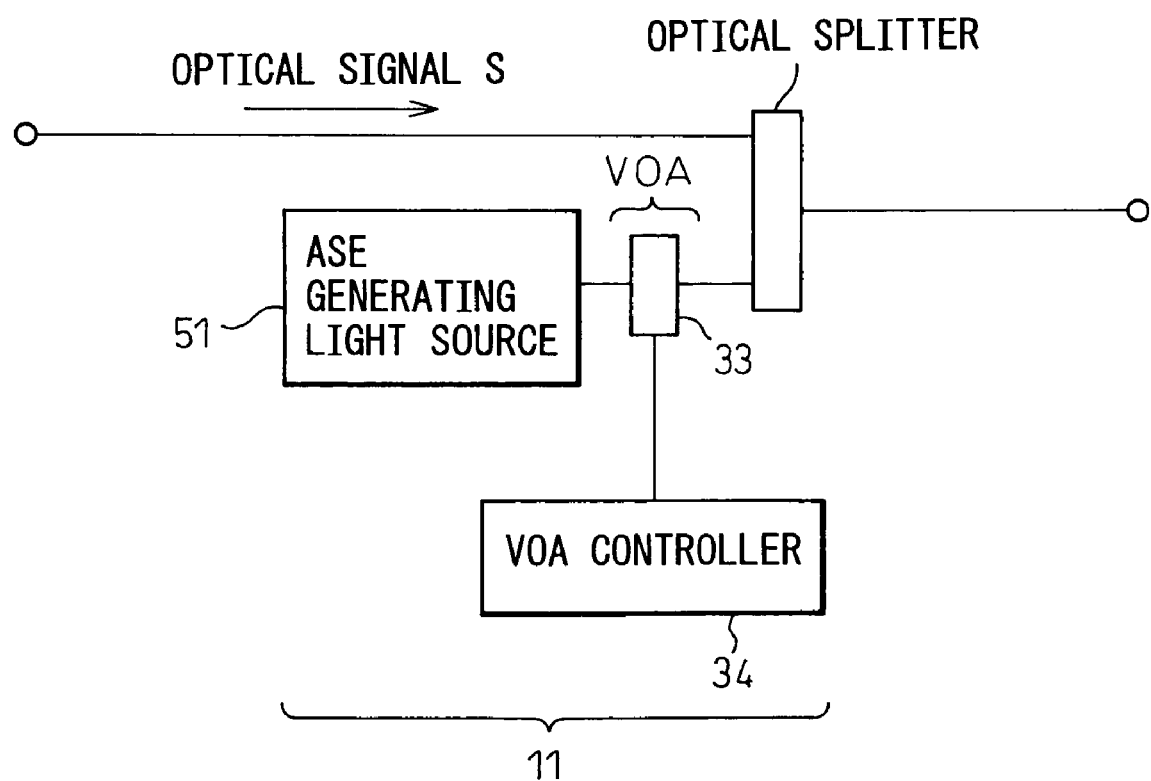
FIG. 15 is a view of an example of an optical noise power change imparting means.

FIG. 15 is a view of an example of an optical noise power change imparting means and corresponds to an optical transmitting/receiving node 2 (TX) including the above change (optical noise power change) generating means 11. Note that the optical signal S in this figure is the optical output from any one of the plurality of transmitters 31 (1 to 4) shown in FIG. 14.

If adding the optical noise power to the optical signal S of this figure through an optical splitter, the OSNR changes. This change of the OSNR can be detected by the change detecting means 12. In this case, the means 12 can be comprised by the above explained OSM 7. In general an OSM 7 can obtain a grasp of the change of an OSNR.

Referring to FIG. 15, the optical noise is obtained from for example an amplified spontaneous emission (ASE) generating light source 51. The optical power of the optical signal S is maintained constant, so if adjusting the level of the optical noise power, it is possible to generate the desired change of the OSNR. The optical noise power level can be adjusted in this case by the above-mentioned VOA's 33 and VOA controller 34 (FIG. 11).

Above, the overall configuration of an optical network system 1 of the present invention was explained, but features of the present invention may also be found in the individual configurations of the optical transmitting/receiving nodes 2, optical route switching nodes 3, and NMS 4 forming the system 1. These are discussed below.

First, looking at the optical transmitting/receiving nodes 2, each optical transmitting/receiving node 2 is located in an optical network system 1 comprised of optical route switching nodes 3 for switching optical routes of optical signals S and an NMS 4 for managing the nodes (2, 3) and optical transmission lines 5 connecting the nodes and is provided with a change generating means 11 for causing a temporary change in the optical transmission characteristics of an optical signal S transmitted to it in accordance with a command from the NMS 4. Here, the optical transmission characteristics mean at least one of the characteristics of optical power, wavelength, polarization, and optical noise power.

Further, when there are optical amplifiers (22) operating under ALC in the system 1 and the change generating means 11 is a means for generating a change of optical power as the change of the optical transmission characteristics, this change generating means generates this change by a speed faster than the response speed of the ALC. Alternatively, the optical amplifiers (2) are switched from ALC to AGC and the change is generated by a speed slower than the response speed of AGC.

Next, looking at the optical route switching nodes 3, each optical route switching node 2 is located in an optical network system 1 comprised of optical transmitting/receiving nodes 2 and an NMS 4 for managing the nodes (2, 3) and optical transmission lines 5 connecting the nodes and is provided with a change detecting means 12 for detecting if a temporary change in the optical transmission characteristics of an optical signal S has appeared at the input port 9 and output port 10 when receiving the optical signal S. Here, the optical transmission characteristics mean at least one of the characteristics of optical power, wavelength, polarization, and optical noise power.

Each node 3 is provided with a forwarding unit 17 for forwarding results of detection of change by the change detecting means 12 to the NMS 4.

Further, looking at the NMS 4, this NMS 4 is located in an optical network system 1 provided with optical transmitting/receiving nodes 2 and optical route switching nodes 3 and having the optical route switching nodes 3 detect if a temporary change in the optical transmission characteristics of an optical signal S has appeared at its input port 9 and output port 10 and has a wavelength path monitoring means 13. This means 13 extracts only the monitored optical route switching nodes 3 through which the wavelength path being monitored passes and their input ports 9 and output ports 10 based on the network configuration information and determines if the changes have appeared at all of the input ports and output ports based on the results of detection of the change at the extracted monitored optical route switching nodes 3 so as to confirm connection and track the wavelength path being monitored. Here, the wavelength path monitoring means 13 has a monitoring table 15 (I) for recording and storing the extracted monitored optical route switching nodes 3 and their input ports 9 and output ports 10 and has a notifying unit 16 for notifying the monitored optical route switching nodes 3 that they should report the results of detection of the change.

Further, another mode of NMS 4 is located in the above optical network system 1 and has another mode of wavelength path monitoring means 13. This means 13 determines the wavelength path to be monitored, causes the optical transmitting/receiving node 2 serving as the optical transmitting end office of the wavelength path to generate the above change, and identifies all of the optical route switching nodes 3 through which this wavelength path passes based on the results of detection of the change notified from all of the optical route switching nodes 3 so as to confirm connection and track the wavelength path to be monitored. Here, the wavelength path monitoring means 13 further collects information on the detection start time of detection of the change and determines the order of connection of the optical route switching nodes 3 along the wavelength path from the order of the detection start times for confirmation of connection and tracking of the wavelength path.

This wavelength path monitoring means 13 has a monitoring table 15 (II) in which the optical route switching nodes 3 to be monitored and the timings of start of detection of change are linked, has a notifying unit 16 for notifying these optical route switching nodes 3 that they should report the results of detection of the change, and has a timing synchronizing means 19 for synchronizing the timings at the optical route switching nodes 3 and the timing in the wavelength path monitoring means 13. More preferably, when there are a plurality of wavelength paths with the same wavelengths of the optical signals S, but with different optical routes, it has a managing unit 18 for managing the end offices so as not to allow the above change given to the wavelength paths to be generated simultaneously.

As explained in detail above, according to the present invention, there is provided an optical network system provided with wavelength path monitoring means enabling confirmation of connection and tracking of a wavelength path laid between two optical transmitting/receiving nodes 2 (TX) and 2 (RX) (i) at a high speed, (ii) without requiring special dedicated hardware, (iii) with a small scale and low cost, and (iv) without being limited by the transmission format or the specifications of various vendor hardware.

While the invention has been described with reference to specific embodiments chosen for purpose of illustration, it should be apparent that numerous modifications could be made thereto by those skilled in the art without departing from the basic concept and scope of the invention.

What is claimed is:

1. An optical network system provided with optical transmitting/receiving nodes serving as optical transmitting/receiving end offices of an optical signal, optical route switching nodes for switching optical routes of said optical signal, and a network management system for managing the nodes and optical transmission lines connecting the nodes, comprising:

a change generating function unit temporarily changing an optical power of said optical signal, which has a step-like waveform, as transmitted from an optical transmitting/receiving node;

a change detecting function unit detecting whether the change of the optical power has appeared at an input port and an output port at each involved optical route switching node;

a wavelength path monitoring function unit extracting only monitored optical route switching nodes through which the wavelength path to be monitored passes and their respective, involved input ports and output ports, based on network configuration information held by said network management system, and confirming that said changes have appeared at all of the involved input ports and output ports based on the results of change detections obtained from said change detecting function units for the extracted monitored optical route switching nodes so as to confirm connection and tracking of the wavelength path to be monitored; and optical amplifiers amplifying said optical signal and operating under ALC in said optical network system and said change generating function unit is a function unit generating a change of optical power of said optical signal, wherein said change generating function unit generates said change at a speed faster than a response speed of said ALC so that the optical amplifiers do not amplify the received optical power changed signal, wherein said network management system further comprises a managing unit managing end offices so as not to allow simultaneous generation of changes to wavelength paths when there are a plurality of wavelength paths with the same wavelengths of optical signals transferred on wavelength paths, but different optical routes in said optical network system.

2. An optical network system as set forth in claim 1, wherein said wavelength path monitoring function unit has a monitoring table recording and storing extracted monitored optical route switching nodes and their respective input ports and output ports.

3. An optical network system as set forth in claim 1, wherein said wavelength path monitoring function unit comprises a notifying unit, to notify the monitored optical route switching nodes and report the results of detection of said change.

4. An optical network system as set forth in claim 1, wherein said optical route switching nodes further comprising forwarding units forwarding the results of detection of said change to said network management system.

5. An optical network system as set forth in claim 1, wherein said optical network system includes optical amplifiers for amplifying said optical signal and operating under ALC and said optical network system and said change generating function unit is a function unit generating a change of optical power as the change of said optical transmission characteristics, at the time of start of operation of said wavelength path monitoring function unit, said optical amplifiers are switched from ALC to AGC and said change generating function unit generates said change at a speed slower than a response speed of said AGC.

6. An optical network system provided with optical transmitting/receiving nodes serving as optical transmitting/receiving end offices of an optical signal, optical route switching nodes for switching optical routes of said optical signal, and a network management system for managing the nodes and optical transmission lines connecting these nodes, comprising:
   a change generating function unit temporarily changing an optical power of said optical signal as transmitted from an optical transmitting/receiving node;
   a change detecting function unit detecting whether the change of the optical power has appeared at the input port and output port at each optical route switching node concerned;
   a wavelength path monitoring function unit in said network management system determining a wavelength path to be monitored, making said optical route transmitting/receiving node serving as the transmitting end office of the determined wavelength path start up said change generating function unit, and identifying all optical route switching nodes through which said wavelength path passes based on the results of detection of change by said change detecting function units notified from all of said optical route switching nodes so as to confirm connection and track the wavelength path to be monitored, said wavelength path monitoring function unit further collects information on the times of start of detection of said change by said change detecting function units and determines the order of connection of said specified optical route switching nodes along said wavelength path from the order of the times of start of detection so as to confirm connection and track said wavelength path, so that further comprising a time synchronizing function unit synchronizing the times in said optical route switching nodes and the time in said wavelength path monitoring function unit; and
   optical amplifiers amplifying said optical signal and operating under ALC in said optical network system and said change generating function unit is a function unit generating a change of optical power, wherein said change generating function unit generates said change at a speed faster than a response speed of said ALC,
   wherein said network management system further comprises a managing unit managing end offices so as not to allow simultaneous generation of changes to wavelength paths when there are a plurality of wavelength paths with the same wavelengths of optical signals transferred on wavelength paths, but different optical routes in said optical network system.

7. An optical network system as set forth in claim 6, wherein said wavelength path monitoring function unit has a monitoring table linking said identified optical route switching nodes and each time of start of detection of said change.

8. An optical network system as set forth in claim 6, wherein said wavelength path monitoring function unit comprises a notifying unit, to notify the monitored optical route switching nodes and report the results of detection of said change.

9. An optical network system as set forth in claim 6, wherein said optical route switching nodes further comprising forwarding units for forwarding the results of detection of said change to said network management system.

10. An optical network system as set forth in claim 6, wherein said optical network system includes optical amplifiers for amplifying said optical signal and operating under ALC and said optical network system and said change generating function unit is a function unit generating a change of optical power as the change of said optical transmission characteristics, said change generating function unit generates said change at a speed faster than a response speed of said ALC.

11. An optical network system as set forth in claim 6, wherein said optical network system includes optical amplifiers for amplifying said optical signal and operating under ALC and said optical network system and said change generating function unit is a function unit generating a change of optical power as the change of said optical transmission characteristics, at the time of start of operation of said wavelength path monitoring function unit, said optical amplifiers are switched from ALC to AGC and said change generating function unit generates said change at a speed slower than a response speed of said AGC.

12. An optical network system as set forth in claim 6, wherein: said network management system further comprises a managing unit managing end offices so as not to allow simultaneous generation of changes to wavelength paths when there are a plurality of wavelength paths with the same wavelengths of optical signals transferred on wavelength paths, but different optical routes in said optical network system.

13. An optical transmitting/receiving node in an optical network system provided with optical transmitting/receiving nodes serving as optical transmitting/receiving end offices of an optical signal, optical route switching nodes for switching an optical route of said optical signal, and a network management system for managing these nodes and optical transmission lines connecting these nodes, each said optical transmitting/receiving node further comprising:
   a change generating function unit temporarily changing an optical power of said transmitted optical signal, which has a step-like waveform, in accordance with a command from said network management system,
   wherein said optical network system includes optical amplifiers for amplifying said optical signal and operating under ALC and said optical network system and said change generating function unit is a function unit generating a change of optical power of said optical signal, said change generating function unit generates said change at a speed faster than a response speed of said ALC,
   wherein at the time of start of operation of said wavelength path monitoring function unit, said optical amplifiers are switched fro ALC to AGC and said change generating function unit generates said change at a speed slower than a response speed of said AGC, and
   said network management system further comprises a managing unit managing end offices so as not to allow simultaneous generation of changes to wavelength paths when there are a plurality of wavelength paths with the same wavelengths of optical signals transferred on wavelength paths, but different optical routes in said optical network system.

14. An optical route switching node in an optical network system provided with optical transmitting/receiving nodes serving as optical transmitting/receiving end offices of an optical signal, optical route switching nodes for switching an optical route of said optical signal, and a network management system for managing these nodes and optical transmission lines connecting these nodes, said optical route switching node comprising:
   a change detecting function unit detecting if a temporary change of optical power of said optical signal has appeared at the input port and output port when receiving said optical signal, the temporary change of optical power being generated by a change generating function unit temporarily changing the optical power of said optical signal, which has a step-like waveform;

a forwarding unit forwarding results of detection of change by said change detecting function unit to said network management system including a monitoring table linking said identified optical route switching nodes and each time of start of detection of said change; and optical amplifiers amplifying said optical signal and operating under ALC in said optical network system and said change generating function unit is a function unit generating a change of optical power, wherein said change generating function unit generates said change at a speed faster than a response speed of said ALC, wherein said network management system further comprises a managing unit managing end offices so as not to allow simultaneous generation of changes to wavelength paths when there are a plurality of wavelength paths with the same wavelengths of optical signals transferred on wavelength paths, but different optical routes in said optical network system.

15. A network management system in an optical network system provided with optical transmitting/receiving nodes serving as optical transmitting/receiving end offices of an optical signal, optical route switching nodes for switching an optical route of said optical signal, and a network management system managing these nodes and optical transmission lines connecting these nodes, each optical route switching node detecting if a temporary change in an optical power of an optical signal has appeared at its input port and output port, the temporary change of optical power being generated by a change generating function unit temporarily changing the optical power of said optical signal, which has a step-like waveform, each said network management system comprising:

a wavelength path monitoring function unit extracting only monitored optical route switching nodes through which the wavelength path being monitored passes and their input ports and output ports, based on pre-stored network configuration information, and confirming if the changes have appeared at all of the input ports and output ports based on the results of detection of the change at the extracted monitored optical route switching nodes so as to confirm connection and track the wavelength path being monitored;

optical amplifiers amplifying said optical signal and operating under ALC in said optical network system and said change generating function unit is a function unit generating a change of optical power, wherein said change generating function unit generates said change at a speed faster than a response speed of said ALC; and a managing unit managing the end offices so as not to allow the above change given to wavelength paths to be generated simultaneously when there are a plurality of wavelength paths with the same wavelengths of the optical signals, but with different optical routes.

16. A network management system as set forth in claim 15, wherein said wavelength path monitoring function unit has a monitoring table for recording and storing the extracted monitored optical route switching nodes and their input ports and output ports.

17. A network management system as set forth in claim 15, wherein said wavelength path monitoring function unit further comprises a notifying unit for notifying the monitored optical route switching nodes that they should report the results of detection of the change.

18. A network management system in an optical network system comprising optical transmitting/receiving nodes serving as optical transmitting/receiving end offices of an optical signal, optical route switching nodes for switching an optical route of said optical signal, and a network management system for managing these nodes and optical transmission lines connecting these nodes, each optical transmitting/receiving node temporarily changing an optical power generated by a change generating function unit temporarily changing the optical power of said transmitted optical signal, which has a step-like waveform, in accordance with a command from said network management system, each optical route switching node detecting if said change has appeared at the input port and output port, said network management system further comprising:

a wavelength path monitoring function unit determining the wavelength path to be monitored, causing the optical transmitting/receiving node serving as the optical transmitting end office of the wavelength path to generate the above change, and identifying all of the optical route switching nodes through which this wavelength path passes, based on the results of detection of the change notified from all of the optical route switching nodes so as to confirm connection and track the wavelength path to be monitored; and optical amplifiers amplifying said optical signal and operating under ALC in said optical network system and said change generating function unit is a function unit generating a change of optical power of said optical signal, wherein said change generating function unit generates said change at a speed faster than a response speed of said ALC so that the optical amplifiers do not amplify the received optical power changed signal, wherein said wavelength path monitoring means further collects information on the detection start time of detection of the change and determines the order of connection of the optical route switching nodes along the wavelength path from the order of the detection start times for confirmation of connection and tracking of the wavelength path, said wavelength path monitoring function unit further comprises a time synchronizing function unit synchronizing the times at the optical route switching nodes and the time in the wavelength path monitoring function unit, and said network management system further comprises a managing unit managing end offices so as not to allow simultaneous generation of changes to wavelength paths when there are a plurality of wavelength paths with the same wavelengths of optical signals transferred on wavelength paths, but different optical routes in said optical network system.

19. A network management system as set forth in claim 18, wherein said wavelength path monitoring means further comprises a monitoring table linking the optical route switching nodes to be monitored and the times of start of detection of change.

20. A network management system as set forth in claim 18, wherein said wavelength path monitoring function unit further comprises a notifying unit r notifying the optical route switching nodes to report the results of detection of the change.

21. A network management system as set forth in claim 18, further comprising a managing unit managing the end offices so as not to allow the above change given to wavelength paths to be generated simultaneously when there are a plurality of wavelength paths with the same wavelengths of the optical signals, but with different optical routes.

* * * * *

UNITED STATES PATENT AND TRADEMARK OFFICE
CERTIFICATE OF CORRECTION

PATENT NO. : 7,664,397 B2  Page 1 of 1
APPLICATION NO. : 11/038281
DATED : February 16, 2010
INVENTOR(S) : Masahiro Yuki et al.

It is certified that error appears in the above-identified patent and that said Letters Patent is hereby corrected as shown below:

Column 22, Line 47, change "fro" to --from--.

Signed and Sealed this

Fourth Day of May, 2010

David J. Kappos
*Director of the United States Patent and Trademark Office*